(12) United States Patent
Suzuki

(10) Patent No.: US 9,784,383 B2
(45) Date of Patent: Oct. 10, 2017

(54) ACTUATOR AND ASSEMBLING METHOD THEREOF

(71) Applicant: DENSO CORPORATION, Kariya, Aichi-pref. (JP)

(72) Inventor: Takahito Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 14/694,140

(22) Filed: Apr. 23, 2015

(65) Prior Publication Data

US 2015/0308583 A1  Oct. 29, 2015

(30) Foreign Application Priority Data

Apr. 25, 2014  (JP) ................. 2014-091408

(51) Int. Cl.
| | |
|---|---|
| *F02D 9/00* | (2006.01) |
| *F16K 31/04* | (2006.01) |
| *F02D 9/02* | (2006.01) |
| *F02D 9/12* | (2006.01) |
| *F02B 31/06* | (2006.01) |
| *F02D 9/10* | (2006.01) |
| *F02D 11/10* | (2006.01) |
| *F16K 31/53* | (2006.01) |
| *F16K 31/56* | (2006.01) |
| *F02B 37/18* | (2006.01) |

(52) U.S. Cl.
CPC ............ *F16K 31/047* (2013.01); *F02B 31/06* (2013.01); *F02D 9/02* (2013.01); *F02D 9/1065* (2013.01); *F02D 9/12* (2013.01); *F02D 11/10* (2013.01); *F16K 31/043* (2013.01); *F16K 31/53* (2013.01); *F16K 31/56* (2013.01); *F02B 37/186* (2013.01); *F02B 2275/48* (2013.01); *F02D 2009/0264* (2013.01); *Y02T 10/125* (2013.01); *Y02T 10/146* (2013.01)

(58) Field of Classification Search
CPC ........ F16K 31/047; F16K 31/53; F16K 31/56; F16K 31/043; F02D 9/1065; F02D 11/10; F02D 9/02; F02D 9/12; F02D 2009/0264; F02B 31/06; F02B 2275/48; F02B 37/186; Y02T 10/146; Y02T 10/125
See application file for complete search history.

(56) References Cited

U.S. PATENT DOCUMENTS

| | | | |
|---|---|---|---|
| 5,996,551 A * | 12/1999 | Schroder ............... | F02D 9/02 123/337 |
| 2008/0011269 A1 | 1/2008 | Tanimura et al. | |
| 2008/0087248 A1 * | 4/2008 | Saito ................... | F02D 9/107 123/337 |

* cited by examiner

*Primary Examiner* — Victor Macarthur
(74) *Attorney, Agent, or Firm* — Nixon & Vanderhye PC

(57) ABSTRACT

In an electric actuator, one end portion of a return spring is hooked to a first slit formed in a radially outer guide of an output gear, so that the return spring is twisted for a predetermined angle that is slightly smaller than an initial set angle. A tilted slit portion is formed at an opening of a second slit that is formed in a covering wall of a spring installation member to twist the return spring to a predetermined initial set angle. Thereby, simultaneously with assembling of a valve shaft to the output gear, the return spring is twisted for the initial set angle. Thus, an assembling work of the electric actuator can be simplified.

12 Claims, 11 Drawing Sheets

OUTPUT GEAR PRESS FITTING DIRECTION

ACTUATOR AND ASSEMBLING METHOD THEREOF

CROSS REFERENCE TO RELATED APPLICATION

This application is based on and incorporates herein by reference Japanese Patent Application No. 2014-91408 filed on Apr. 25, 2014.

TECHNICAL FIELD

The present disclosure relates to an actuator and an assembling method thereof.

BACKGROUND

A known electric actuator transmits a drive torque of an electric motor to a rotatable shaft of a throttle valve (a throttle shaft), as disclosed in, for example, JP2008-019825A (corresponding to US2008/0011269A1). As shown in FIGS. 11A and 11B, one such electric actuator includes a throttle gear 102, a return spring 103, and an installation member 104. The throttle gear 102 transmits a drive torque of the electric motor to a throttle shaft 101 of a throttle valve to rotate the throttle shaft 101. The return spring 103 generates a resilient force relative to the throttle gear 102 to urge the throttle shaft 101 in a rotational direction (valve closing side) to rotate a rotational position of the throttle shaft 101 to an initial position. The return spring 103 is installed between the throttle gear 102 and the installation member 104.

With reference to FIG. 11A, one axial end portion of the throttle shaft 101 is fitted into a fitting hole 105 of the throttle gear 102. When the one axial end portion of the throttle shaft 101 projects through the fitting hole 105, the one axial end portion of the throttle shaft 101 is fixed to a center portion of the throttle gear 102 by plastically deforming a projected tip of the one end portion of the throttle shaft 101, which projects from the fitting hole 105, as shown in FIG. 11B.

A spring guide 106 and a movable hook 107 are formed in the throttle gear 102. The spring guide 106 is configured into a cylindrical tubular form and supports a radially inner side of a coil of the return spring 103. A first end portion 111 of the return spring 103 is engaged to the movable hook 107.

A spring guide 108 and a stationary hook 109 are formed in the installation member 104. The spring guide 108 is configured into a cylindrical tubular form and supports the radially inner side of the coil of the return spring 103. A second end portion 112 of the return spring 103 is fixed to the stationary hook 109.

In the above described electric actuator, at the time of assembling the throttle gear 102 and the return spring 103 to the throttle shaft 101, first of all, the first end portion 111 of the return spring 103 is installed to the movable hook 107 of the throttle gear 102, and the coil of the return spring 103 is placed to surround the spring guide 106. Thereby, the return spring 103 is set to the throttle gear 102.

Thereafter, as shown in FIG. 11A, in a state where the coil of the return spring 103 is twisted by an initial set angle, and the throttle gear 102 is urged against, for example, a full-closing side stopper, the one axial end portion (a fitting portion 110) of the throttle shaft 101 is fitted into the fitting hole 105 of the throttle gear 102.

Next, in order to fix the throttle gear 102 to the fitting portion 110 of the throttle shaft 101, as shown in FIG. 11B, the fitting portion 110 is fixed to the throttle gear 102 by plastically deforming the tip of the fitting portion 110, or the fitting portion 110 is securely press fitted into the fitting hole 105. In this way, the gear assembly is assembled to the installation member 104.

However, in the above-described electric actuator, the assembling work of the gear assembly relative to the installation member 104 is very complicated, so that the efficiency of the assembling work is deteriorated.

Furthermore, at the spring guides 106, 108, which guide the radially inner side of the coil of the return spring 103, a boundary (a gap S) is intrinsically generated between the throttle gear 102 and the installation member 104. Thus, wearing may cause generation of an undesirable play between the spring guides 106, 108, or a wire of the coil of the return spring 103 may possibly enter the gap S to cause malfunction of the electric actuator.

SUMMARY

The present disclosure addresses the above disadvantages.

According to the present disclosure, there is provided an actuator that includes an electric motor, a gear, a spring, and an installation member. The gear transmits a drive torque of the electric motor to a shaft of a drive subject to rotate the shaft of the drive subject. The spring has one end portion, which is installed to the gear. The spring generates an urging torque for urging the shaft in a rotational direction to rotate a rotational position of the shaft to a predetermined position. Another end portion of the spring is installed to the installation member. The gear includes a radially inner guide, a radially outer guide, and a first slit. The radially inner guide is formed around a rotational axis of the gear. The radially outer guide is configured into a tubular form and is placed on a radially outer side of the radially inner guide while a receiving hole, which is configured into an annular form, is interposed between the radially inner guide and the radially outer guide. The first slit is located adjacent to an opening of the receiving hole and is formed by recessing a portion of the radially outer guide. The one end portion of the spring is engaged to or is held by the first slit. The spring includes a coil that is spirally wound and is located between the one end portion and the another end portion of the spring. The coil is resiliently deformably received in an inside of the receiving hole. The installation member includes a covering wall and a second slit. The covering wall is placed adjacent to an opposite side of the receiving hole, which is opposite from the opening of the receiving hole. The covering wall is located on a radially outer side of the radially outer guide in such a manner that the covering wall partially overlaps with the radially outer guide while a predetermined radial gap is interposed between the radially outer guide and the covering wall. The second slit is formed by recessing a portion of the covering wall. The another end portion of the spring is engaged to or held by the second slit. The second slit has an opening, which opens at an axial end surface of the covering wall in an axial direction of the rotational axis, and the second slit includes a second slit hole and a tilted slit portion. The second slit hole extends linearly from the opening of the second slit to a deep side in the axial direction of the rotational axis or extends from the opening of the second slit to the deep side in the axial direction of the rotational axis while the second slit is bent in a middle of the second slit. The another end portion of the spring is insertable into the second slit hole from the opening of the second slit toward the deep side. The tilted slit portion is formed at an opening side of the second slit hole. The another end portion of the spring is moved along the tilted slit portion to twist the coil to a predetermined set angle at a time of installing the another end portion of the spring to the second slit.

According to the present disclosure, there is also provided an assembling method of the above actuator. The assembling method includes a first step of forming a gear assembly by assembling the spring to the gear, and a second step of assembling the another end portion of the spring and the gear assembly to the installation member.

BRIEF DESCRIPTION OF THE DRAWINGS

The drawings described herein are for illustration purposes only and are not intended to limit the scope of the present disclosure in any way.

DETAILED DESCRIPTION

Figure 1:
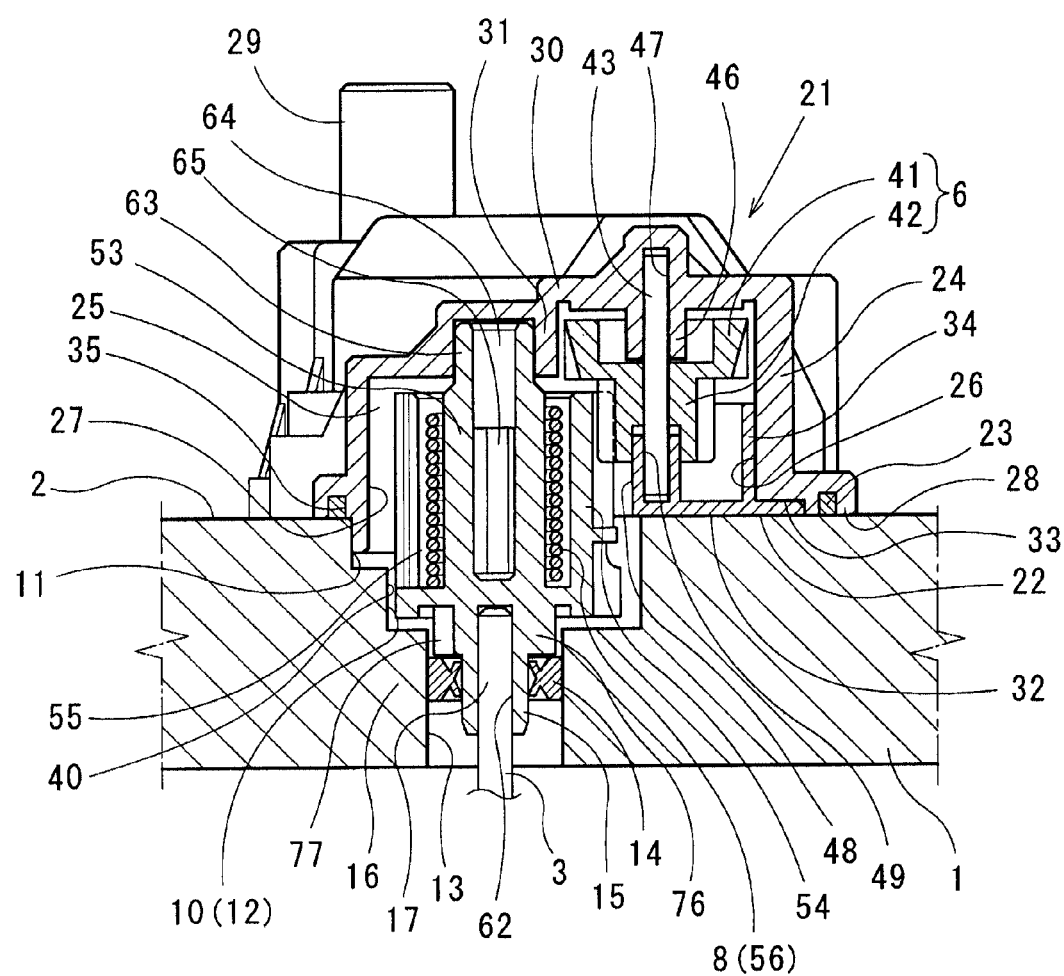
FIG. 1 is a cross-sectional view of an electric actuator according to a first embodiment of the present disclosure.

Various embodiments of the present disclosure will be described with reference to the accompanying drawings.

First Embodiment

FIGS. 1 to 6B show an electric actuator according to a first embodiment of the present disclosure.

The actuator of the present embodiment is an electric actuator that has functional components received in an inside of a housing fixed to a support portion 2 of an intake manifold 1, which serves as a fixation member at an internal combustion engine (hereinafter referred to as an engine), such as a gasoline engine.

The electric actuator of the present embodiment includes an electric motor (hereinafter referred to as a motor) M and a gear train. The motor M drives a tumble control valve device, which includes a plurality of tumble valves and a valve shaft 3. The gear train includes a worm gear 5, an intermediate gear 6, and an output gear 7 and transmits rotation (a drive torque) of a motor shaft 4 of the motor M to the valve shaft 3.

Furthermore, the electric actuator includes a return spring 8. The return spring 8 generates an urging torque (a torsional resilient force) relative to the output gear 7 of the gear train to urge the valve shaft 3 in a rotational direction to rotate a rotational position of the valve shaft 3 to a predetermined position (initial position), i.e., to urge the valve shaft 3 in a valve opening direction toward a full-opening position of the respective tumble valves (toward a valve opening side).

Here, the output gear 7 and the return spring 8 are assembled as an output gear subassembly (hereinafter referred to as an output gear assembly or simply referred to as a gear assembly) 9 before installation of the output gear 7 and the return spring 8 to the support portion 2 of the intake manifold 1. Then, the output gear assembly 9 is assembled to the support portion 2 of the intake manifold 1.

The engine is a vehicle drive engine installed in a vehicle (e.g., an automobile). In the present embodiment, a multi-cylinder gasoline engine, which combusts an air-and-fuel mixture, i.e., a mixture of fuel injected from an injector and the air, is used as the engine.

An air intake duct (an air intake conduit), which forms an air intake passage (a flow passage) for conducting the intake air (fresh air) after passing through an air cleaner or the EGR gas, is connected to an intake port of each cylinder of the engine through the intake manifold 1 made of synthetic resin. Furthermore, an exhaust duct (an exhaust conduit), which forms an exhaust passage for conducting exhaust gas outputted from a combustion chamber of each cylinder of the engine, is connected to an exhaust port of each cylinder of the engine through an exhaust manifold.

The intake manifold 1 serves as an installation member of the present disclosure. The intake manifold 1 includes the support portion (a fastening portion) 2, to which the electric actuator is securely fastened with a plurality of screws (not shown). A plurality of nuts (not shown) is insert molded in the support portion 2.

A connecting end surface is formed in an end surface of the support portion (a spring installation member) 2 of the intake manifold 1 such that the housing, which receives the respective functional components of the electric actuator, is connected to the connecting end surface. The connecting end surface of the intake manifold 1 is a planar surface that is opposed to a connecting end surface of the housing such that a minute gap is interposed between the connecting end surface of the intake manifold 1 and the connecting end surface of the housing. Furthermore, an inside-to-outside communicating hole (also referred to as a gear installation hole) 10, which communicates between an inside and an outside of the intake manifold 1, is formed in the support portion 2 of the intake manifold 1.

The inside-to-outside communicating hole 10 includes a large diameter hole 11, an intermediate diameter hole 12 and a small diameter hole 13. The large diameter hole 11 has a circular cross section and opens in the connecting end surface (an outer surface) of the support portion 2. The intermediate diameter hole 12 has an inner diameter that is smaller than an inner diameter of the large diameter hole 11, and the intermediate diameter hole 12 is formed on a flow passage side (an inner side) of the large diameter hole 11, at which the flow passage of the intake air is located. The small diameter hole 13 has a circular cross section and has an inner diameter that is smaller than the inner diameter of the intermediate diameter hole 12, and the small diameter hole 13 is formed on a flow passage side (an inner side) of the intermediate diameter hole 12, at which the flow passage of the intake air is located. The small diameter hole 13 opens in an inner surface (a flow passage wall surface) of the support portion 2. A first step, which is configured into an arcuate form, is formed between the large diameter hole 11 and the intermediate diameter hole 12. A second step, which is configured into an arcuate form, is formed between the intermediate diameter hole 12 and the small diameter hole 13.

The small diameter hole 13 has a function of a first bearing hole, which rotatably supports a projecting shaft portion 15 of the output gear 7 of the gear train through a seal member 14, such as an oil seal, a gasket or a packing. Therefore, a cylindrical tubular portion of the support portion 2, which surrounds the small diameter hole 13 in a circumferential direction, has a function of a first bearing support portion 16 that holds the seal member 14.

The intake manifold 1 includes a surge tank and a plurality of intake branch conduits. The surge tank reduces or limits pressure fluctuation of the intake air that has passed through a throttle body (not shown), which receives a throttle valve in a manner that enables opening and closing of the throttle valve. The intake branch conduits are parallel to each other and are arranged one after another in a direction of a row of the cylinders.

An intake branch flow passage is formed in each of the intake branch conduits and is communicated with the combustion chamber and an intake port of the corresponding cylinder of the engine. The intake branch flow passages are branched at an intake branching portion (surge tank) placed at the upstream end of the intake manifold 1 and are connected to the cylinders, respectively.

A partitioning portion (not shown), such as a partition wall, is formed in an inside of each of the intake branch flow passages to partition the intake branch flow passage into a first intake branch flow passage and a second intake branch flow passage.

Details of the support portion 2 of the intake manifold 1 will be discussed later.

The tumble control valve device includes the tumble valves and the valve shaft 3. Each of the tumble valves opens and closes the first intake branch flow passage of a corresponding one of the intake branch conduits. The valve shaft 3 is made of metal and extends through the tumble valves in an axial direction of the rotational axis of the tumble valves.

The tumble valves serve as drive subjects of the present disclosure. The tumble valves are rotatable butterfly valves (plate valves), which are arranged one after another and are coupled together by the single valve shaft 3 that extends through the tumble valves.

When the tumble control valve device is fully closed, the first intake branch flow passage of each intake branch conduit is closed. At this time, the intake air passes only through the second intake branch flow passage, which is opened, in the intake branch flow passage of each intake branch conduit, so that a flow of the intake air is biased to an upper portion of the intake branch flow passage, and thereby a tumble flow circulates in the combustion chamber of the corresponding cylinder around an axis that is perpendicular to an axis of the cylinder.

When the tumble control valve device is fully opened, the intake branch flow passage of each of the intake branch conduits is fully opened.

Each tumble valve of the tumble control valve device may be set to have an intermediate valve opening degree at an intermediate rotational position.

The valve shaft 3 serves as a shaft of the drive subjects of the present disclosure. The valve shaft 3 is a rotatable shaft (an output shaft of the electric actuator), which extends in a direction perpendicular to a flow direction of the intake air in the intake branch flow passage of each of the intake branch flow conduits at the intake manifold 1. The valve shaft 3 extends linearly in the axial direction of the rotational axis of the valve shaft 3, which is parallel to the direction of the row of the intake branch flow passages, i.e., the direction of the row of the cylinders of the engine.

The valve shaft 3 is a single drive shaft that synchronously drives all of the tumble valves by extending the valve shaft 3 though the tumble valves to connect the tumble valves together.

The valve shaft 3 is made of metal and is configured such that a cross sectional area of the valve shaft 3 is configured into a circular form (but a portion of the valve shaft 3 has a polygonal cross section). The valve shaft 3 includes a first projecting shaft portion and a second projecting shaft portion, which are located at one end side and another end side, respectively, of the valve shaft 3 in the axial direction of the rotational axis. A valve holding portion, to which the tumble valves are securely press fitted, is formed between the first projecting shaft portion and the second projecting shaft portion.

The first projecting shaft portion is a projection, which is located at the one end side of the valve holding portion in the axial direction of the rotational axis. The first projecting shaft portion is rotatably received in the inside-to-outside communicating hole 10 of the intake manifold 1, particularly, in the intermediate diameter hole 12 and the small diameter hole 13. A fitting shaft part 17, which is formed at a distal end side of the first projecting shaft portion, has a polygonal cross section and is integrally rotatably connected to the projecting shaft portion 15 of the output gear 7 in the intermediate diameter hole 12 and the small diameter hole 13.

The second projecting shaft portion is a projection, which is located on the other end side of the valve holding portion in the axial direction of the rotational axis and has a cross section that is configured into a circular form. The second projecting shaft portion is rotatably received in a second bearing hole (not show) of a second bearing support portion of the intake manifold 1.

The electric actuator includes the functional components, which are received in the housing fixed to the support portion 2 of the intake manifold 1.

The housing includes an actuator case (hereinafter referred to as a case) 21, a gear cover 22, and a gasket 23. The case 21 is configured into a cup form and receives, for example, the motor M, the gear train and the return spring 8. An intermediate gear shaft 43, which will be described later in detail, is securely press fitted into the gear cover 22. The gasket 23 is configured into an annular form and air tightly seals a minute gap between the connecting end surface (a installation seat surface) of the support portion 2 of the intake manifold 1 and a connecting end surface (a installation seat surface) of the case 21.

The case 21 is made of synthetic resin and is integrally formed (seamlessly and continuously formed). The case 21 includes a recess, which is placed between the case 21 and the gear cover 22 and receives the functional components (e.g., the gear train and the return spring 8) of the electric actuator.

The case 21 includes an outer peripheral wall 24, case open portions 26, 27 and an opening peripheral edge portion 28. The outer peripheral wall 24 is configured into a rectangular tube form and surrounds the functional components of the electric actuator. The case open portions 26, 27 open at a lower end (the support portion 2 side) of the outer peripheral wall 24 in FIG. 1 to receive the motor M, the gear train, and the return spring 8 into an actuator receiving chamber 25 of the case 21 at the time of assembly. The opening peripheral edge portion 28 is configured into an annular belt form and surrounds the case open portions 26, 27.

The case open portion 26 is closed by the gear cover 22. The case open portion 27 is not closed by the gear cover 22 and is placed coaxially with the inside-to-outside communicating hole 10 that opens in the connecting end surface (the installation seat surface) of the support portion 2.

The case 21 includes a plurality of installation bosses (not shown) and a connector 29. The bosses are used to fix the housing, more specifically the case 21 to the support portion 2 of the intake manifold 1. The connector 29 is provided to make an external electrical connection. Specifically, the connector 29 connects between the motor M and an external circuit.

The opening peripheral edge portion 28 of the case 21 and an end surface (a planar surface) of each of the installation bosses form a connecting portion (the installation seat surface of the case 21), which is joined to the connecting end surface of the support portion 2 of the intake manifold 1 with a plurality of screws. An output gear guide 31 is formed in a bottom wall (ceiling wall) 30 of the case 21.

The gear cover 22 is made of synthetic resin or metal and is integrally formed. The gear cover 22 includes a planar plate 32, which partially closes the case open portions 26, 27. The plate 32 is clamped between a step 33, which is formed at an inner side of the opening peripheral edge portion 28 of the case 21, and the connecting end surface of the support portion 2.

The gear cover 22 includes an engaging wall 34. The engaging wall 34 projects from the plate 32 toward the bottom wall (the ceiling wall) 30 of the case 21 and has an engaging portion (not shown) that is snap fitted to an inner surface of the outer peripheral wall 24 of the case 21.

The gasket 23 is made of a rubbery elastic material (elastomer) and is integrally formed. The gasket 23 is installed to an installation groove 35 of the opening peripheral edge portion 28 of the case 21. The gasket 23 forms an airtight seal portion, which tightly contacts the installation seat surface of the support portion 2 of the intake manifold 1 and airtightly seals the minute gap between the installation seat surface of the support portion 2 of the intake manifold 1 and the installation seat surface of the opening peripheral edge portion 28 of the case 21.

The actuator receiving chamber 25, which is formed between the case 21 and the gear cover 22, particularly a motor receiving chamber that receives the motor M, is provided with a damper spring (not shown), which is configured into a thin plate form and limits vibrations the motor M.

The motor M is received and is held in the actuator receiving chamber 25, particularly, the motor receiving chamber. The motor M is a brushed DC motor, in which an inner rotor is rotatably placed on a radially inner side of an outer stator. Specifically, the motor M includes the inner rotor (an armature), a stator, a brush holder, and first and second brushes. The armature includes the motor shaft 4, which linearly extends in a direction of a rotational axis of the motor shaft 4. The stator is configured into a tubular form and surrounds the armature in a circumferential direction (a motor circumferential direction). The brush holder is fixed to the stator. The first and second brushes are received in and are held by the brush holder.

The stator of the motor M includes a motor case (e.g., a motor yoke) and a plurality of permanent magnets (field magnets). The motor case rotatably receives the motor shaft 4 of the armature. The permanent magnets are fixed to an inner peripheral surface of the motor yoke.

The armature of the motor M is placed on the radially inner side of the stator, and a predetermined radial gap is formed between the stator and the armature. The armature includes the motor shaft 4, an armature iron core (an armature core), armature windings (armature coils) and a commutator. The motor shaft 4 is rotatably supported by bearing support portions (bearing holders) of the motor case through bearings. The armature core is formed by stacking magnetic steel plates in the axial direction of the rotational axis of the motor shaft 4. The armature windings (serving as a motor winding portion) are wound around the armature core. The first and second brushes are urged against the commutation.

The armature coils cooperate with brush terminals 36, motor terminals of the connector 29, the first brush, the second brush, and the commutator to form an internal conductor of the motor M. Furthermore, the first and second brushes are connected to an external electric power source (a battery) through the brush terminals 36, the motor terminals and an electric power supply line.

The motor M, which is the drive source of the electric actuator, is electrically connected to the external electric power source (the battery) through a motor drive circuit, which is electronically controlled by an engine control unit (ECU) that is also referred to as an electronic control device.

The ECU includes a microcomputer, which at least includes a CPU, a ROM and a RAM.

When an ignition switch of the vehicle is turned on (IG ON), the ECU controls the electric power supply to the motor M of the tumble control valve device for driving the tumble control valve device based on a control program stored in a memory (e.g., the ROM) of the microcomputer.

At the ECU, sensor signals, which are received from an airflow meter, a crank angle sensor, an accelerator opening degree sensor, a throttle opening degree sensor, an intake air temperature sensor, a coolant temperature sensor and an exhaust gas sensor (an air-fuel ratio sensor, an oxygen concentration sensor), undergo analog-to-digital (A/D) conversion through an A/D converter circuit and are then supplied to the microcomputer.

Next, the details of the gear train will be described with reference to FIGS. 1 to 6.

The gear train includes the worm gear 5, the intermediate gear 6, and the output gear 7. The worm gear 5 is configured into a cylindrical tubular form and is fixed to the outer peripheral surface of the motor shaft 4 of the motor M. The intermediate gear 6 is configured into a cylindrical tubular form and is meshed with the worm gear 5. The output gear 7 is configured into a cylindrical tubular form and is meshed with the intermediate gear 6 to rotate integrally with the intermediate gear 6. The gear train is used as a speed reducing gear mechanism that reduces a rotational speed of rotation transmitted from the motor shaft 4 of the motor M. The worm gear 5, the intermediate gear 6 and the output gear 7 are received and held in the actuator receiving chamber 25 of the case 21.

The worm gear 5 is made of synthetic resin or metal and is integrally formed (i.e., seamlessly and continuously formed). The worm gear 5 is an input gear that is rotated upon receiving a drive torque of the motor M. The worm gear 5 is integrally rotatably connected to the motor shaft 4. The worm gear 5 includes a cylindrical boss portion that is fixed to the outer peripheral surface of the distal end portion of the motor shaft 4 by, for example, press fitting. A worm gear tooth 39, which is meshed with the intermediate gear 6, spirally extends in an outer peripheral part of the cylindrical boss portion of the worm gear 5.

The intermediate gear 6 includes a helical gear 41 and a pinion gear 42. The helical gear 41 is configured into a cylindrical tubular form and is meshed with the worm gear 5. The pinion gear 42 is configured into a cylindrical tubular form and is directly connected to the helical gear 41. The intermediate gear 6 is rotatably supported by the outer peripheral surface of the intermediate gear shaft 43.

The helical gear 41 is made of synthetic resin or metal and is integrally formed. The helical gear 41 includes a cylindrical boss portion (a large diameter portion), which surrounds the intermediate gear shaft 43 in the circumferential direction. The helical gear 41 is rotatably supported by the outer peripheral surface of the intermediate gear shaft 43. Large gear teeth (helical gear teeth) 44, which are meshed with the worm gear tooth 39 of the worm gear 5, are arranged one after another in the circumferential direction along the entire outer peripheral surface of the cylindrical boss portion of the helical gear 41.

The pinion gear 42 is integrally formed from synthetic resin or metal. The pinion gear 42 has an outer diameter that is smaller than an outer diameter of the helical gear 41. The pinion gear 42 is directly connected to an end surface of the helical gear 41. Alternatively, the pinion gear 42 may be formed integrally with the helical gear 41 through a resin molding process. The pinion gear 42 is a gear that is rotated integrally with the helical gear 41 upon receiving a drive torque of the motor M. The pinion gear 42 includes a cylindrical boss portion (a small diameter portion) that surrounds the intermediate gear shaft 43 in the circumferential direction. Small diameter gear teeth (pinion gear teeth) 45, which are meshed with the output gear 7, are arranged one after another in the circumferential direction along the entire outer peripheral surface of the cylindrical boss portion of the pinion gear 42.

The intermediate gear shaft 43 extends in a direction that is perpendicular to the axial direction (the axial direction of the rotational axis) of the motor shaft 4. One axial end portion of the intermediate gear shaft 43 is press fitted (fixed) into a fitting recess 47 of a shaft holding portion (a first cylindrical tubular portion) 46 of the case 21. Furthermore, the other axial end portion of the intermediate gear shaft 43 is press fitted (fixed) into a fitting recess 49 of a shaft holding portion (a second cylindrical tubular portion) 48 of the gear cover 22.

Details of the output gear 7 will be discussed later.

Next, details of the return spring 8 will be described with reference to FIGS. 1 to 6B.

The return spring 8 is placed between a first spring hook (a movable hook, a first slit 51) of the output gear 7 and a second spring hook (a stationary hook, a second slit 52) of the support portion 2 of the intake manifold 1.

The return spring 8 is a formed by configuring a single metal wire (a metal wire or a coil wire having a circular cross section) into a predetermined form.

The return spring 8 is a compression coil spring that exerts an urging torque (a torsional torque), which urges the tumble valves in a valve opening direction, to the output gear 7. The return spring 8 includes a coil 56, a first bent portion, a second bent portion, a first end portion (also referred to as one end portion) 57, and a second end portion (also referred to as another end portion) 58. The coil 56 is spirally wound and is resiliently deformably (allowing torsional deformation, diameter reducing deformation, and diameter increasing deformation of the coil 56) received in a coil receiving chamber (a coil receiving hole formed between an outer peripheral surface of a radially inner guide 53 and an inner peripheral surface of a radially outer guide 54) of the output gear 7. The first bent portion and the second bent portion are formed by radially outwardly bending two end portions, respectively, of the coil 56. The first end portion 57 and the second end portion 58 extend, i.e., project linearly in the radially outward direction from the first bent portion and the second bent portion, respectively.

The coil 56 of the return spring 8 is formed by spirally winding the coil wire, which has the circular cross section. The coil 56 is placed on a radially outer side of the radially inner guide 53 of the output gear 7 such that the coil 56 spirally surrounds the radially inner guide 53. Furthermore, the coil 56 is received in an inside of the radially outer guide 54 of the output gear 7.

The first end portion 57 of the return spring 8 is inserted toward a deep side of the first slit 51 of the output gear 7 through an opening of the first slit 51 and is engaged to a turn-back portion 59, such as a projection that reduces a size of the opening of the first slit 51, so that the first end portion 57 of the return spring 8 is engaged to or is held by the first slit 51. The first end portion 57 includes a first linear part 57*a* that projects linearly from the one axial end of the coil 56 in the radially outward direction (or alternatively a tangential direction). The first linear part 57*a* has a length that enables engagement of the first linear part 57*a* with the first slit 51. Furthermore, in a state where the coil 56 is received in the coil receiving chamber (also referred to as a coil receiving hole) 55, a distal end side of the first linear part 57*a* of the first end portion 57 projects from the inside of the radially outer guide 54 to the outside of the radially outer guide 54 through the first slit 51.

The second end portion 58 of the return spring 8 is inserted toward a deep side of the second slit 52 of the support portion 2 through an opening 52*a* of the second slit 52 and is engaged to or is held by the second slit 52. The second end portion 58 includes a second linear part 58*e* that projects linearly from the other axial end of the coil 56 in the radially outward direction (or alternatively a tangential direction). The second linear part 58*e* has a length that enables engagement of the second linear part 58*e* with the second slit 52. Furthermore, in the state where the coil 56 is received in the coil receiving chamber 55, a distal end side of the second linear part 58e of the second end portion 58 projects from the inside of the radially outer guide 54 to the outside of the radially outer guide 54 through an open portion 74.

Next, details of the output gear 7 will be described with reference to FIGS. 1 to 6B.

The output gear 7 serves as a gear of the present disclosure and is integrally formed (seamlessly and continuously formed) from synthetic resin. The output gear 7 includes the projecting shaft portion 15, the radially inner guide (also referred to as a projecting shaft portion) 53, the radially outer guide (also referred to as a partially cylindrical outer peripheral wall) 54, and a base plate 61. The projecting shaft portion 15 is configured into the cylindrical tubular form and is integrally rotatably connected to the valve shaft 3. The radially inner guide 53 is configured into a cylindrical tubular form and is formed around the rotational axis (central axis) of the output gear 7. The radially outer guide 54 is configured into a partially cylindrical form (a tubular form) and is placed on a radially outer side of the radially inner guide 53 while the coil receiving chamber 55, which is configured into the annular form, is interposed between the radially inner guide 53 and the radially outer guide 54. The projecting shaft portion 15 projects from the base plate 61, which is configured into a circular plate form, in the downward direction in FIG. 2 (toward the flow passage side).

The projecting shaft portion 15 includes a fitting hole 62. The fitting hole 62, which is configured as a polygonal hole (a rectangular hole), opens at an end surface of the projecting shaft portion 15 and extends linearly toward a deep side in the axial direction to enable insertion of the fitting shaft part 17 of the valve shaft 3 into the fitting hole 62. A press fitting hole, into which the fitting shaft part 17 of the valve shaft 3 is press fitted, is formed in a portion of the fitting hole 62 or an entire extent of the fitting hole 62.

The projecting shaft portion 15 has a small diameter shaft part and a large diameter shaft part. The small diameter shaft part of the projecting shaft portion 15 is formed at a distal end side of the projecting shaft portion 15 and is configured into a cylindrical tubular form. The large diameter shaft part of the projecting shaft portion 15 is formed at the base plate 61 side (a proximal end side) of the projecting shaft portion 15 and has an outer diameter, which is larger than an outer diameter of the small diameter shaft part of the projecting shaft portion 15 and is smaller than an outer diameter of the base plate 61. The seal member 14 is installed to an outer peripheral surface of the small diameter shaft part of the projecting shaft portion 15.

Furthermore, the projecting shaft portion 15 is placed in the small diameter hole 13 of the inside-to-outside communicating hole 10 of the intake manifold 1. The radially inner guide 53, the radially outer guide 54 and the base plate 61 are placed in the large diameter hole 11 and the intermediate diameter hole 12 of the inside-to-outside communicating hole 10.

As discussed above, the output gear 7 includes the radially inner guide (the projecting shaft portion) 53, which is formed around the rotational axis (the central axis) of the output gear 7, and the radially outer guide (the partially cylindrical outer peripheral wall) 54, which is placed on the radially outer side of the radially inner guide 53 while the coil receiving chamber 55, which is configured into the annular form, is interposed between the radially inner guide 53 and the radially outer guide 54 in the radial direction.

The radially inner guide 53 is an output gear inner side cylindrical tubular portion, which guides (supports) an inner peripheral side of the return spring 8 while a predetermined radial gap is interposed between the output gear inner side cylindrical tubular portion and the inner peripheral side of the return spring 8. The radially inner guide 53 projects from an upper surface of the base plate 61 in the upward direction in FIG. 2 (toward an opposite side that is opposite from the projecting shaft portion 15). Furthermore, the outer diameter of the radially inner guide 53 is set to form a radial gap between the radially inner guide 53 and the coil 56 of the return spring 8 when the inner diameter of the coil 56 of the return spring 8 becomes a minimum size by rotating the output gear 7 in a returning direction (the valve opening direction) toward the initial position (the full opening position).

A projecting shaft part 63, which is configured into a cylindrical tubular form having an annular cross section, is formed at a distal end side of the radially inner guide 53. The projecting shaft part 63 is slidably supported in a guide hole of the output gear guide 31 of the case 21. Furthermore, the guide hole of the output gear guide 31 forms an output gear slide hole, along which an outer peripheral surface of the projecting shaft part 63 of the output gear 7 directly slides.

Furthermore, an axial hole 64 is formed in the inside of the radially inner guide 53. The axial hole 64 opens in a distal end surface of the radially inner guide 53 and extends linearly from the opening of the axial hole 64 in the axial direction of the central axis.

A circular hole, through which an inspection jig (not shown) for inspecting a set torque of the return spring 8 is insertable, is formed at the opening side of the axial hole 64. Furthermore, a hexagonal hole 65, into which a hexagonal part of the inspection jig (not shown) is engageable, is formed at the deep side of the axial hole 64.

The radially outer guide 54 is an output gear outer side cylindrical tubular portion, which circumferentially covers an outer peripheral side of the coil 56 of the return spring 8 while a predetermined radial gap is interposed between the output gear outer side cylindrical tubular portion and the coil 56. The inner diameter of the radially outer guide 54 is set to form the radial gap between the radially outer guide 54 and the coil 56 of the return spring 8 when the inner diameter of the coil 56 of the return spring 8 becomes a maximum size by rotating the output gear 7 in a valve closing direction (a direction opposite from the full opening direction) toward a full closing position.

Furthermore, a gear tooth forming portion 66, which is configured into a partially arcuate form, is formed in an outer peripheral surface of the radially outer guide 54. Output gear teeth 67, which are meshed with the pinion gear teeth 45 of the pinion gear 42, are arranged one after another in the rotational direction (circumferential direction) in a predetermined angular range in an outer peripheral part of the gear tooth forming portion 66.

Two toothless portions 71, 72, each of which is configured to have a cylindrical outer surface and does not have any of the output gear teeth 67, is formed on two opposite sides, respectively, of the gear tooth forming portion 66 in the circumferential direction. Besides the gear tooth forming portion 66 and the toothless portions 71, 72, the radially outer guide 54 includes a toothless portion 73, which is configured as a partially cylindrical surface form like the radially outer guide 54.

An opening 55a of the coil receiving chamber 55, which receives the coil 56 of the return spring 8, opens at an axial end surface 54a of the radially outer guide 54. The coil receiving chamber 55 is the coil receiving hole (a spring receiving hole, a cylindrical space) and extends linearly in the axial direction of the rotational axis from the opening 55a to a bottom surface 68 located at the deep side. The coil receiving chamber 55 has an axial depth that enables insertion of two axial end portions (a first coil end portion and a second coil end portion, a first coil end turn and a second coil end turn) of the coil 56 of the return spring 8 into the coil receiving chamber 55.

The first slit 51 has an opening 51a that opens in a circumferential end surface 54b of the radially outer guide 54 in the rotational direction (the circumferential direction). The first slit 51 includes a circumferential slit hole (a first slit hole) 75 that extends linearly from the opening 51a of the first slit 51 toward a deep side in the rotational direction. The first end portion 57 of the return spring 8 is insertable into the circumferential slit hole 75 from the opening 51a of the first slit 51 toward the deep side in the rotational direction. The circumferential slit hole 75 has the turn-back portion 59, which limits removal of the first end portion 57 of the return spring 8 from the circumferential slit hole 75.

The open portion 74 is formed between a circumferential end surface of the toothless portion 71 and a circumferential end surface of the toothless portion 72.

The first slit 51, to which the first end portion 57 of the return spring 8 is engaged or is held, is formed in the toothless portion 72 and is located adjacent to the opening 55a of the coil receiving chamber 55. The first slit 51 is formed by recessing a portion of the radially outer guide 54, i.e., by penetrating the portion of the radially outer guide 54 from the inside to the outside of the radially outer guide 54.

The toothless portion 73 includes a plurality of projecting walls (not shown), which project from an outer peripheral surface of the toothless portion 73 in the radially outward direction. A circumferential side surface of one of the projecting walls, which is located on an opening side in the rotational direction of the output gear 7, may be used as a full-opening side contact part that is in a form of a protrusion. Furthermore, another circumferential side surface of another one of the projecting walls, which is located on a closing side in the rotational direction of the output gear 7, may be used as a full-closing side contact part that is in a form of a protrusion.

The open portion 74 is an inside-to-outside communicating portion that communicates between the inside of the coil receiving chamber 55 and the outside (outer side) of the radially outer guide 54. The open portion 74 includes a first inside-to-outside communicating hole, through which the first end portion 57 of the return spring 8 is insertable from an inlet part (an inlet part or an opening of the open portion 74), which opens in the axial end surface 54a of the radially outer guide 54, to an inlet part of the first slit 51 in the axial direction of the rotational axis of the output gear 7 at the time of installing the coil 56 of the return spring 8 into the coil receiving chamber 55. The open portion 74 further includes a second inside-to-outside communicating hole, through which the second end portion 58 of the return spring 8 is insertable from the inlet part (the opening) of the open portion 74 to a deep side of the open portion 74 in the axial direction of the rotational axis of the output gear 7 at the time of installing the coil 56 of the return spring 8 into the coil receiving chamber 55.

An intermediate diameter body part (also referred to as the large diameter shaft part) 76, which is configured into a cylindrical tubular form, is formed between the projecting shaft portion 15 (more specifically, the small diameter shaft part of the projecting shaft portion 15) of the output gear 7 and the base plate 61. The outer diameter of the intermediate diameter body part 76 is larger than the outer diameter of the projecting shaft portion 15 (more specifically, the outer diameter of the small diameter shaft part of the projecting shaft portion 15) and is smaller than the outer diameter of the base plate 61. The intermediate diameter body part 76 includes a plurality of projecting walls 77, which project from an outer peripheral surface of the intermediate diameter body part 76 in the radially outward direction. The outer diameter of the intermediate diameter body part 76 is generally equal to the outer diameter of the radially inner guide 53. The deep side of the fitting hole 62 is formed in the inside of the intermediate diameter body part 76.

A circumferential side surface of one of the projecting walls 77, which is located on an opening side in the rotational direction of the output gear 7, may be used as a full-opening side contact part that is in a form of a protrusion.

The full-opening side contact part is stopped when the full-opening side contact part contacts a stepped surface (not shown) of a projection (a full-opening side stopper), which projects into the inside of the inside-to-outside communicating hole 10 of the support portion 2, at the time of rotating the tumble valves and the valve shaft 3 to the full-opening position. In this way, when the full-opening side contact part of the output gear 7 contacts the full-opening side stopper, the further rotational movement of the tumble valves, the valve shaft 3 and the output gear 7 in the valve opening direction is limited.

Furthermore, another circumferential side surface of another one of the projecting walls 77, which is located on a closing side in the rotational direction of the output gear 7, may be used as a full-closing side contact part that is in a form of a protrusion.

The full-closing side contact part is stopped when the full-closing side contact part contacts a stepped surface (not shown) of a projection (a full-closing side stopper), which projects into the inside of the inside-to-outside communicating hole 10 of the support portion 2, at the time of rotating the tumble valves and the valve shaft 3 to the full-closing position. In this way, when the full-closing side contact part of the output gear 7 contacts the full-closing side stopper, the further rotational movement of the tumble valves, the valve shaft 3 and the output gear 7 in the valve closing direction is limited.

Next, details of the support portion 2 of the intake manifold 1 will be described with reference to FIGS. 1, and 4 to 6B.

The support portion 2 of the intake manifold 1 has a covering wall 81 and the second slit 52. The covering wall 81 is configured into a partially cylindrical form and is placed adjacent to an opposite side of the coil receiving chamber 55, which is opposite from the opening 55a of the receiving chamber 55 of the output gear 7 in the axial direction, when the output gear assembly 9 is assembled to the support portion 2. The second slit 52 is formed by recessing a portion of the covering wall 81, and the second end portion 58 of the return spring 8 is engaged to or held by the second slit 52.

The opening 52a of the second slit 52 opens at an axial end surface 81a of the covering wall 81 of the support portion 2 in the axial direction of the rotational axis of the output gear 7 (the axial direction of the support portion 2). The second slit 52 includes an axial slit 82 that extends linearly from the opening 52a of the second slit 52 to a deep side in the axial direction of the rotational axis of the output gear 7 (the axial direction of the support portion 2).

The covering wall 81 is formed in a circumferential portion of the intermediate diameter hole 12 of the insideto-outside communicating hole 10. When the output gear assembly 9 is assembled to the support portion 2, the covering wall 81 is located on a radially outer side of the radially outer guide 54 of the output gear 7 in such a manner that the covering wall 81 partially overlaps with the radially outer guide 54 while a predetermined radial gap 40 is interposed between the radially outer guide 54 and the covering wall 81. The covering wall 81 overlaps with the radially outer guide 54 in the axial direction of the rotational axis and in the rotational direction (the circumferential direction).

The axial slit 82 is a second slit hole (groove), into which the second end portion 58 of the return spring 8 is insertable from the opening 52a of the second slit 52 toward the deep side. A tilted slit portion 83 is formed at an opening side of the axial slit 82. The second end portion 58 of the return spring 8 is moved along the tilted slit portion 83 to twist the coil 56 to a predetermined set angle (also referred to as a predetermined initial set angle or a predetermined gear set angle) θ.

A tapered guide surface 83a is formed on a surface (a hole wall surface) of the tilted slit portion 83 to guide the second end portion 58 of the return spring 8 to a predetermined position (the deep side of the second slit 52) of the axial slit 82 at the time of inserting the output gear assembly 9 into the inside-to-outside communicating hole 10 of the support portion 2 of the intake manifold 1. The tapered guide surface 83a is a tilted surface, which is tilted relative to a moving direction of the output gear assembly 9 with respect to the inside-to-outside communicating hole 10 of the support portion 2 (the installation direction of the output gear assembly 9, i.e., the press fitting direction of the output gear 7 relative to the fitting shaft part 17 of the valve shaft 3) or the axial direction of the rotational axis of the output gear 7.

The axial slit 82 and the tilted slit portion 83 overlap with the radially outer guide 54 of the output gear 7 in both of the axial direction of the rotational axis and the rotational direction (the circumferential direction).

Next, an assembling method of the electric actuator relative to the support portion 2 of the intake manifold 1, particularly, an assembling procedure of the output gear assembly 9 relative to the inside-to-outside communicating hole 10 of the support portion 2 according to the present embodiment will be described with reference to FIGS. 1 to 10C.

Figure 3:
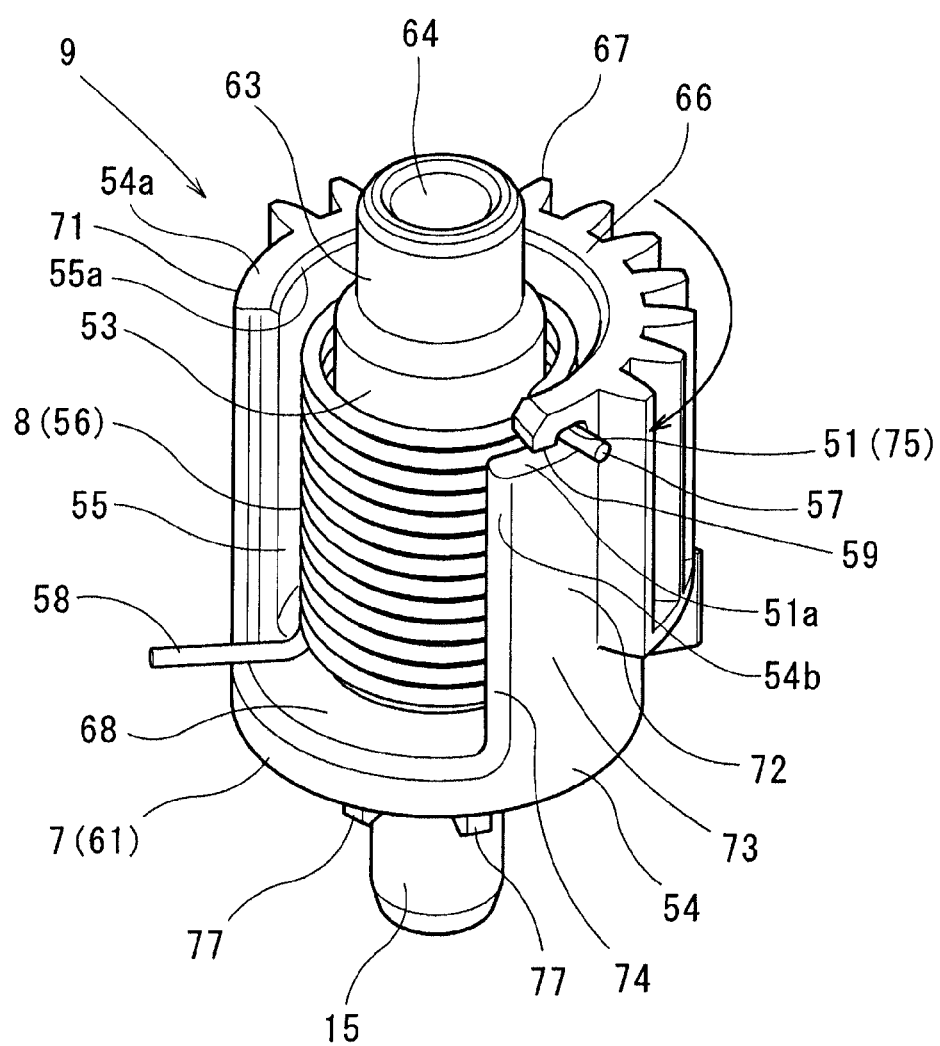
FIG. 3 is a perspective view showing an output gear subassembly according to the first embodiment.

In the present embodiment, prior to the installation of the output gear 7 to the support portion 2 of the intake manifold 1, first of all, as shown in FIG. 3, the valve shaft 3 of the tumble control valve device, the output gear 7, and the return spring 8 are preassembled together to form the output gear assembly 9. Then, as shown in FIGS. 4 to 6B, the output gear assembly 9 is assembled to the support portion 2 of the intake manifold 1.

First of all, the return spring 8 is assembled to the output gear 7 to form the output gear assembly 9 (first step).

In this first step, the return spring 8 is inserted from the axial end surface 54a of the radially outer guide 54, i.e., from the opening 55a of the coil receiving chamber 55, which is formed between the radially inner guide 53 and the radially outer guide 54 of the output gear 7, toward the deep side of the coil receiving chamber 55 such that the other axial end (the coil end) of the coil 56 and the second end portion 58 of the return spring 8 are placed at a leading side in the inserting direction of the return spring 8. At this time, the coil 56 of the return spring 8 is inserted into the coil receiving chamber 55 until the coil end of the coil 56 and the second end portion 58 of the return spring 8 contact (reach) the bottom surface 68.

Furthermore, at the time of inserting the coil 56 of the return spring 8 into the coil receiving chamber 55, the coil 56 is moved in the open portion 74 until the first end portion 57 of the return spring 8 is moved from the inlet part of the open portion 74 to a location adjacent to the inlet part of the first slit 51. Furthermore, at this time, the second end portion 58 of the return spring 8 is moved from the inlet part of the open portion 74 to the deep side of the open portion 74.

Here, when the coil 56 of the return spring 8 is received into the coil receiving chamber 55, a distal end part of the first end portion 57 of the return spring 8 projects from the inside of the coil receiving chamber 55 to the radially outer side of the radially outer guide 54 through the open portion 74. Furthermore, the second end portion 58 of the return spring 8 projects from the inside of the coil receiving chamber 55 to the radially outer side of the radially outer guide 54 through the open portion 74.

Figure 2:
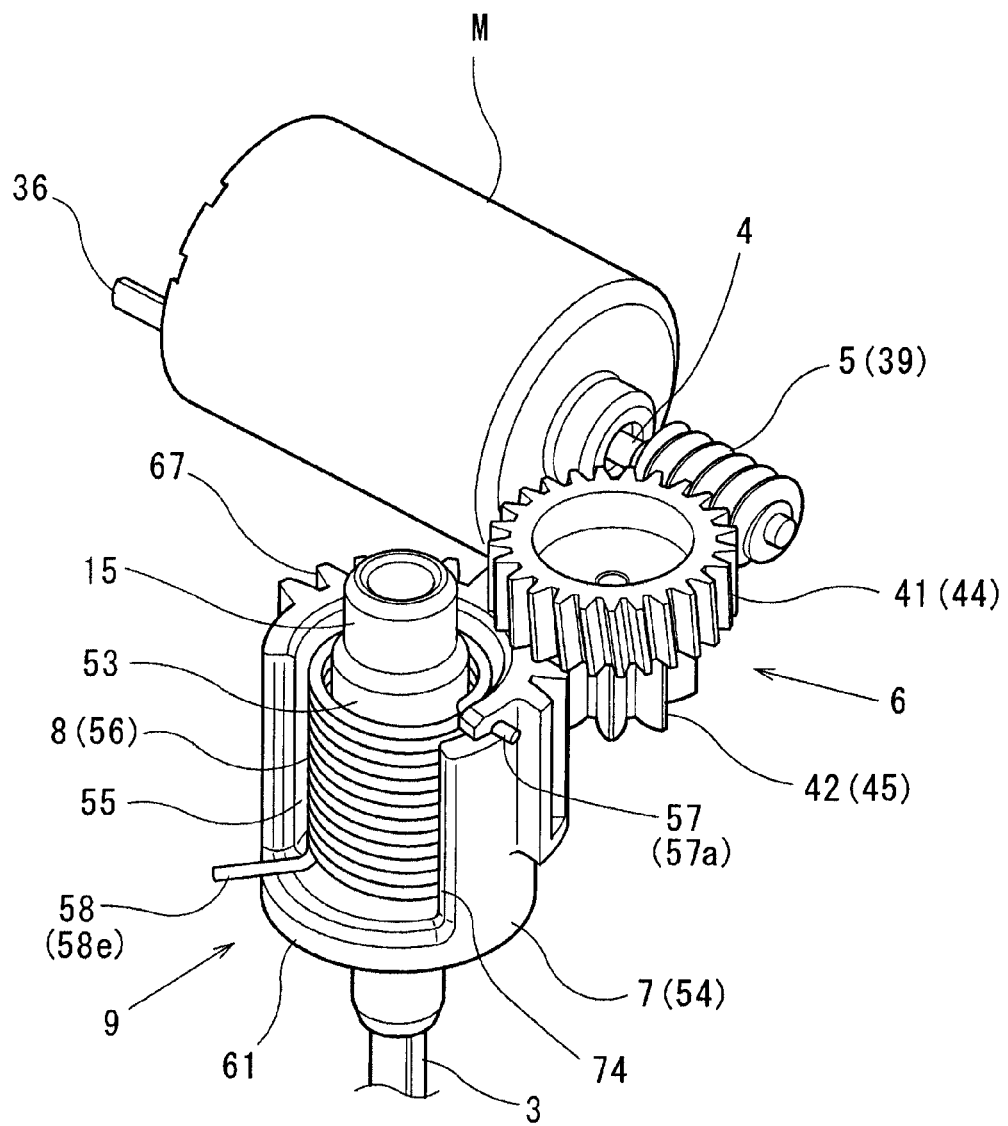
FIG. 2 is a perspective view showing an electric motor and a gear train according to the first embodiment.
Figure 4:
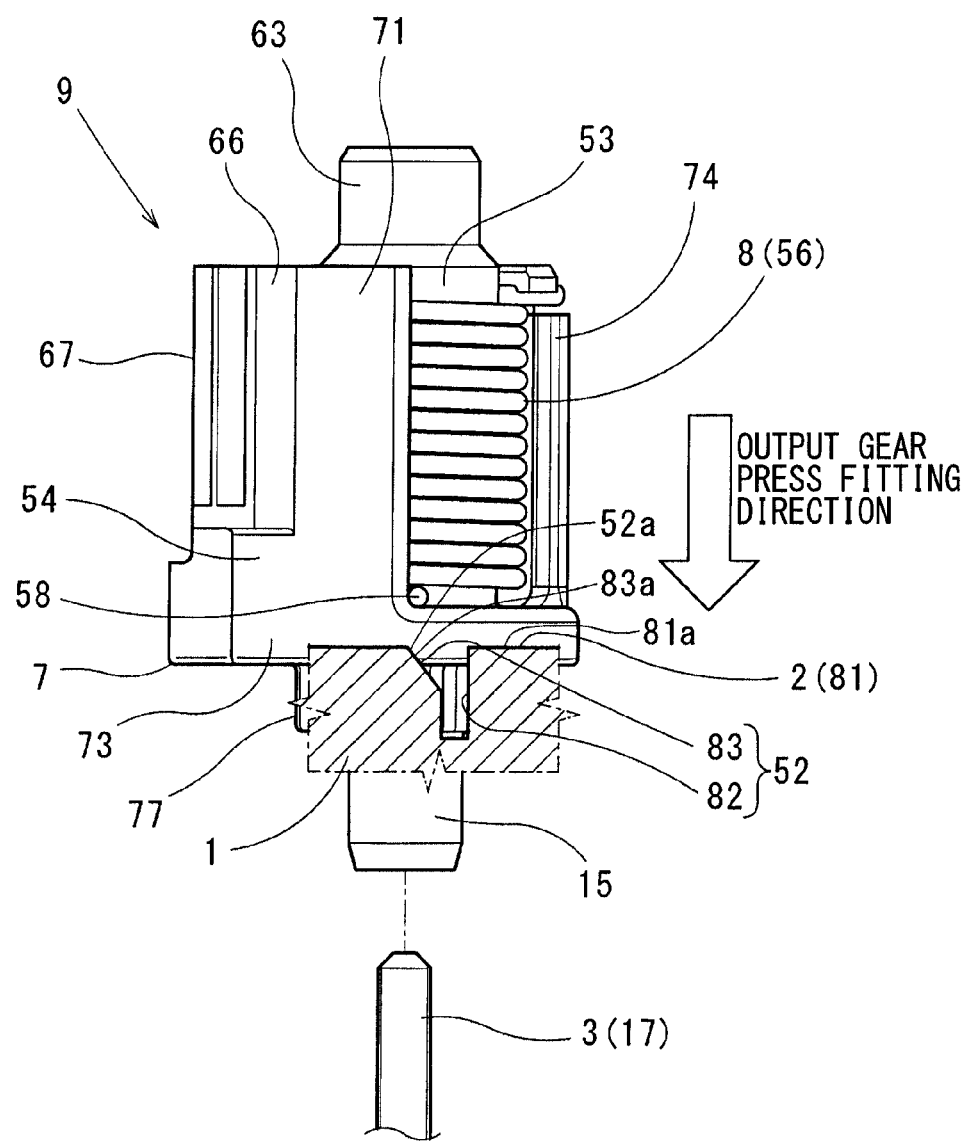
FIG. 4 is a side view showing an assembling procedure for assembling the output gear subassembly and a shaft according to the first embodiment.

After the insertion of the coil 56 of the return spring 8 into the coil receiving chamber 55, the first end portion 57 of the return spring 8 is inserted into the circumferential slit hole 75 of the first slit 51, which is formed in the radially outer guide 54. Specifically, the first end portion 57 of the return spring 8 is inserted from the opening side to the deep side of the circumferential slit hole 75 of the first slit 51, which is formed in the radially outer guide 54, by twisting the first end portion 57 of the return spring 8. Then, the first end portion 57 of the return spring 8 is engaged to, i.e., is hooked to the turn-back portion 59, which is located at the opening side of the circumferential slit hole 75. Also, at this time, as shown in FIGS. 2 to 4, the second end portion 58 of the return spring 8 is projected outward from the radially outer guide 54 of the output gear 7.

Figure 6A:
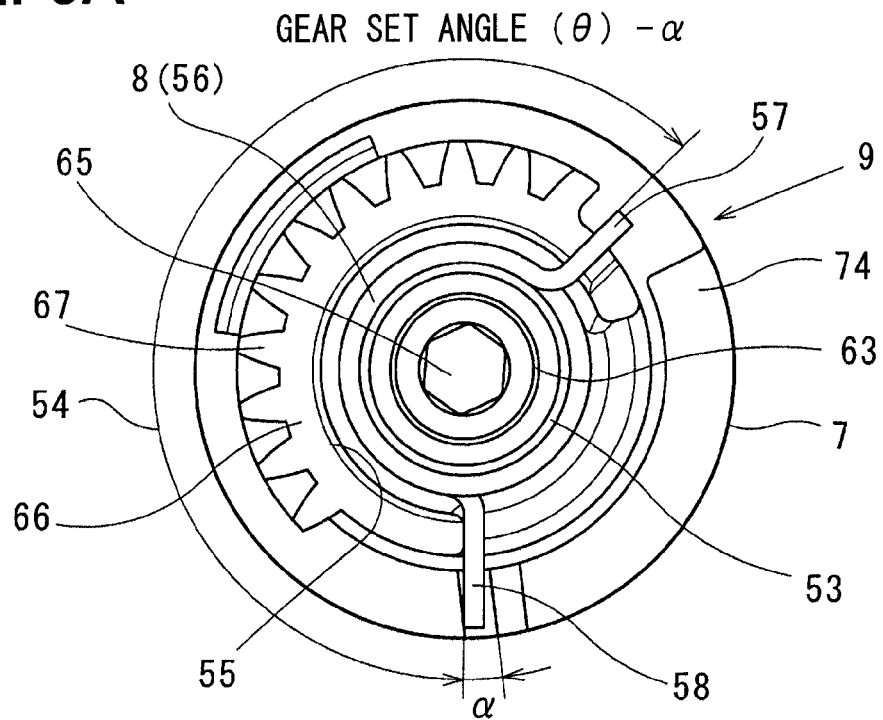
FIG. 6A is a schematic plan view showing a state where a coil of the return spring is set at an angle of "gear set angle ($\theta$)-$\alpha$" according to the first embodiment.

In this way, the first end portion 57 of the return spring 8 is engaged to the turn-back portion 59, which reduces the cross-sectional area of the circumferential slit hole 75 of the first slit 51, so that the first end portion 57 of the return spring 8 is engaged to or held by the circumferential slit hole 75. At this time, as shown in FIG. 6A, the coil 56 of the return spring 8 is twisted by a predetermined angle (α), which is slightly smaller than the necessary predetermined gear set angle (the predetermined initial set angle) θ of the return spring 8.

Next, the output gear assembly 9 is connected to the valve shaft 3 of the tumble control valve device, and at the same time, the second end portion 58 of the return spring 8 and the output gear assembly 9 are assembled to the support portion 2 of the intake manifold 1 (a second step).

In this second step, the fitting shaft part 17 of the valve shaft 3 is aligned to the opening of the fitting hole 62 of the projecting shaft portion 15 of the output gear 7. That is, the output gear 7 of the output gear assembly 9 is positioned relative to the covering wall 81 of the support portion 2 of the intake manifold 1. Specifically, the rotational position (installation position) of the output gear 7 relative to the covering wall 81 of the support portion 2 is set such that the second end portion 58 of the return spring 8 is placed immediately above the tilted slit portion 83, i.e., is placed at the opening side of the axial slit 82 of the second slit 52, which is formed in the covering wall 81 of the support portion 2. Thereafter, the output gear assembly 9 is inserted into (approached to) the inside-to-outside communicating hole 10 of the support portion 2. Thereby, the second end portion 58 of the return spring 8 is assembled to the axial slit 82 of the second slit 52 of the covering wall 81.

Figure 6B:
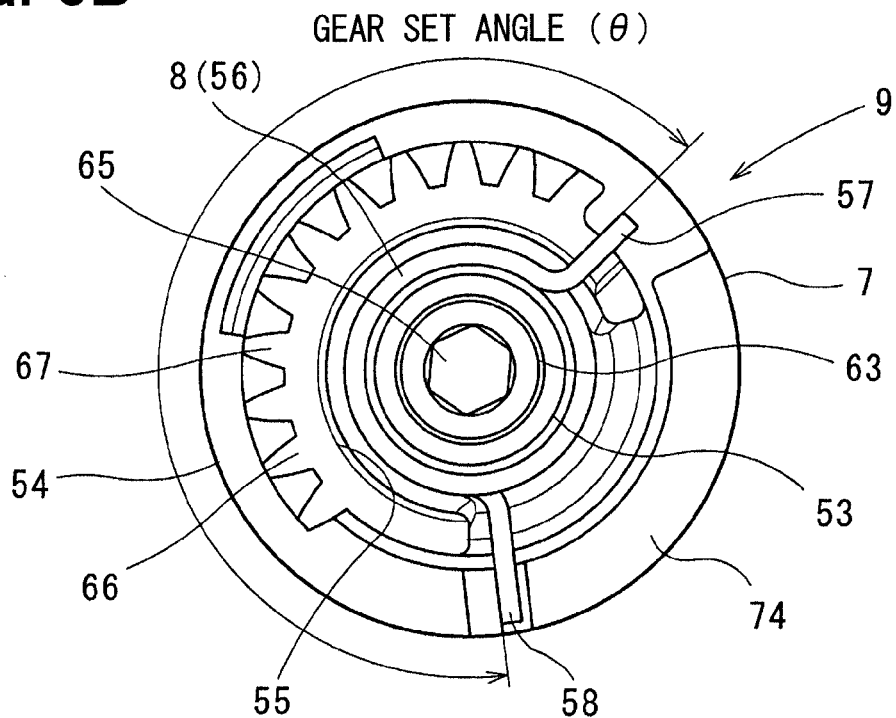
FIG. 6B is a schematic plan view showing another state where the coil of the return spring is set at a gear set angle ($\theta$) according to the first embodiment.

Then, the fitting shaft part 17 of the valve shaft 3 is press fitted into the fitting hole 62 of the projecting shaft portion 15 of the output gear 7, so that the valve shaft 3 and the output gear 7 are joined together to enable integral rotation of the valve shaft 3 and the output gear 7. At the same time, the second end portion 58 of the return spring 8 is moved along the tapered guide surface (the tilted surface) 83a of the tilted slit portion 83 toward the one side in the rotational direction (the circumferential direction) of the output gear 7 and reaches to the deep side of the axial slit 82 of the second slit 52. Specifically, when the output gear 7 is moved in the press fitting direction for press fitting the fitting hole 62 of the projecting shaft portion 15 of the output gear 7 to the outer peripheral surface of the fitting shaft part 17 of the valve shaft 3, the second end portion 58 of the return spring 8, which projects to the outside of the radially outer guide 54 of the output gear 7, is progressively moved toward the one side in the rotational direction (the circumferential direction) of the output gear 7 along the tapered guide surface (the tilted surface) 83a of the tilted slit portion 83 (the tilted surface that is tilted relative to the moving direction of the output gear 7 of the output gear assembly 9, i.e., the press fitting direction of the output gear 7 by the predetermined angle), so that the second end portion 58 of the return spring 8 is moved (press fitted) from the opening side to the deep side of the axial slit 82 of the second slit 52. At this time, as shown in FIG. 6B, the coil 56 of the return spring 8 is twisted from the state shown in FIG. 6A by the predetermined angle (α), which is determined by the tilt angle of the tapered guide surface (tilted surface) 83a of the tilted slit portion 83 and the length of the tapered guide surface (tilted surface) 83a of the tilted slit portion 83, so that the predetermined gear set angle (the predetermined initial set angle) θ of the coil 56 is achieved.

Here, it should be noted that the valve shaft 3 of the tumble control valve device may be integrally rotatably assembled to the projecting shaft portion 15 of the output gear 7 before the time of assembling the second end portion 58 of the return spring 8 to the axial slit 82 of the second slit 52. Furthermore, the valve shaft 3 of the tumble control valve device may be integrally rotatably assembled to the projecting shaft portion 15 of the output gear 7 before the time of assembling the output gear 7 and the return spring 8 together. Furthermore, the valve shaft 3 of the tumble control valve device may be integrally rotatably assembled to the projecting shaft portion 15 of the output gear 7 after the time of assembling the second end portion 58 of the return spring 8 to the axial slit 82 of the second slit 52.

Furthermore, in a case where the material of the output gear 7 is synthetic resin, the fitting shaft part 17 of the valve shaft 3 may be insert molded into the projecting shaft portion 15 of the output gear 7.

Now, advantages of the present embodiment will be described.

As discussed above, in the electric actuator of the present embodiment, first of all, the coil 56 of the return spring 8 is received into the coil receiving chamber 55, which is the annular form and is formed between the radially inner guide 53 and the radially outer guide 54 of the output gear 7. The first end portion 57 of the return spring 8 is inserted into the circumferential slit hole 75 of the first slit 51 of the radially outer guide 54, and the first end portion 57 of the return spring 8 is engaged (hooked) to the turn-back portion 59, which is placed at the opening side of the circumferential slit hole 75. Thereby, the coil 56 of the return spring 8 is twisted by the predetermined angle (α), which is smaller than the necessary predetermined gear set angle (the predetermined initial set angle) θ.

Figure 5A:
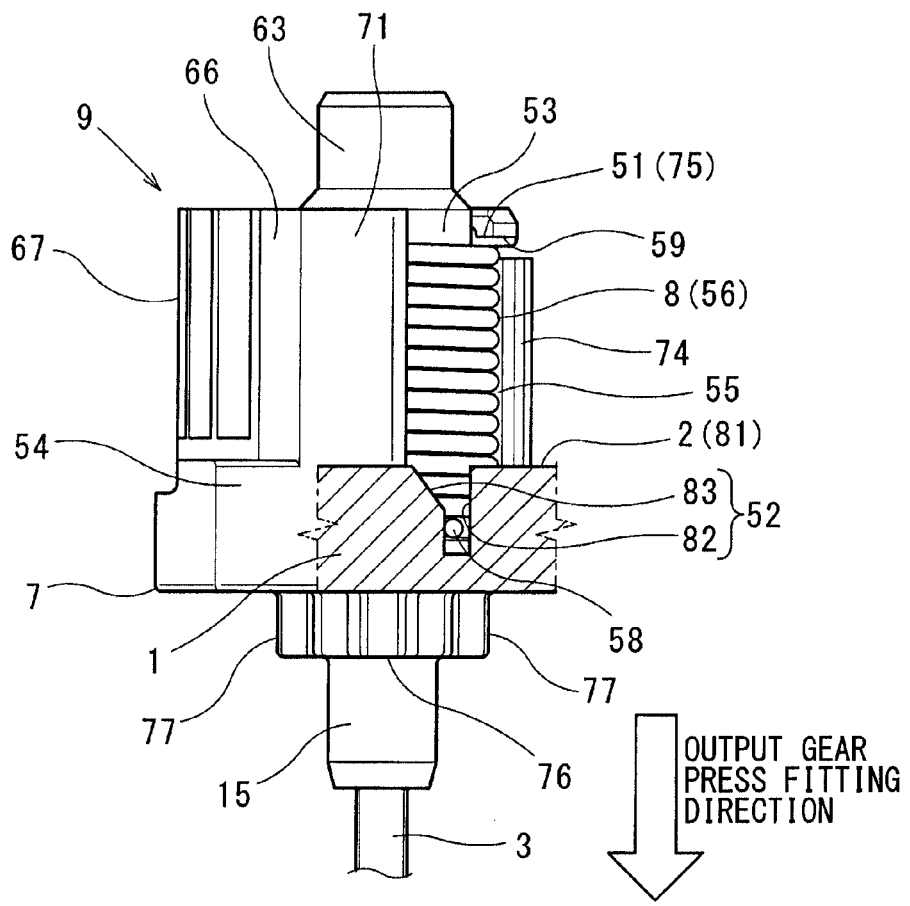
FIG. 5A is a side view showing an assembling procedure for assembling a second end portion of a return spring relative to a covering wall of a support portion of an intake manifold.
Figure 5B:
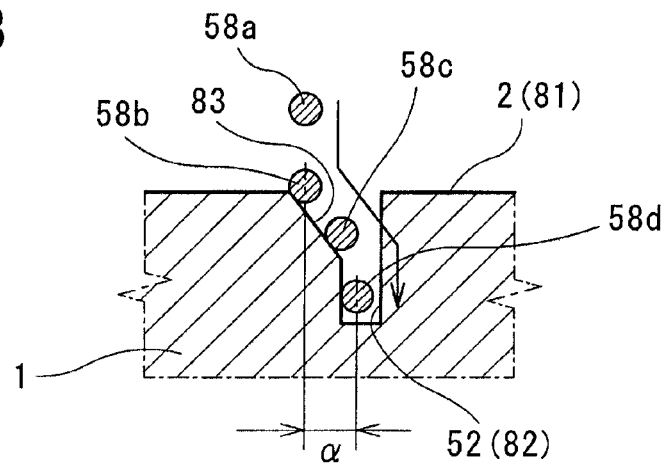
FIG. 5B is a partial enlarged schematic view indicating the assembling procedure for assembling the second end portion of the return spring relative to the covering wall of the support portion of the intake manifold shown in FIG. 5A.

Here, the tilted slit portion 83 is formed at the opening side of the axial slit 82 of the second slit 52 to twist the coil 56 of the return spring 8 to the predetermined gear set angle θ at the time of installing the second end portion 58 of the return spring 8 relative to the second slit 52 of the support portion (the spring installation member) 2 of the intake manifold 1. Thereby, the output gear 7 is moved toward the covering wall 81 of the support portion 2 in order to assemble the second end portion 58 of the return spring 8, which is received in the coil receiving chamber 55 of the output gear 7, to the second slit 52 of the support portion 2. Specifically, when the output gear 7 is moved in the press fitting direction for press fitting the fitting hole 62 of the projecting shaft portion 15 of the output gear 7 to the outer peripheral surface of the fitting shaft part 17 of the valve shaft 3, the second end portion 58 of the return spring 8, which projects to the outside of the radially outer guide 54 of the output gear 7, is progressively moved in an order of the first end portion indicated by numeral 58a, the first end portion indicated by numeral 58b, the first end portion indicated by numeral 58c, and the first end portion indicated by numeral 58d as shown in FIG. 5B toward the one side in the rotational direction (the circumferential direction) of the output gear 7 along the tapered guide surface (the tilted surface) 83a of the tilted slit portion 83 (the tilted surface that is tilted relative to the moving direction of the output gear 7 of the output gear assembly 9, i.e., the press fitting direction of the output gear 7 by the predetermined angle), so that the second end portion 58 of the return spring 8 is moved (press fitted) from the opening side to the deep side of the axial slit 82 of the second slit 52.

In this way, the output gear assembly 9 is joined to the valve shaft 3 of the tumble control valve device, and at the same time, the coil 56 of the return spring 8 is twisted to the predetermined set angle θ. This process can be achieved by simply assembling the second end portion 58 of the return spring 8 to the second slit 52 of the support portion 2 of the intake manifold 1, particularly, by moving the output gear assembly 9 toward the covering wall 81 of the support portion 2. As a result, the assembling work of the electric actuator can be simplified, and thereby the productivity of the electric actuator can be improved.

The portion, which guides the radially inner side of the coil of the return spring 8, is formed by the single component (the integral component), i.e., the radially inner guide 53 of the output gear 7 rather than two separate components. Thus, a gap is not formed at the portion that guides the radially inner side of the coil of the return spring 8, and thereby a gap is not generated in the portion that guides the radially inner side of the coil of the return spring 8. As a result, the coil wire of the return spring 8 will not be fitted into the gap, and thereby occurrence of the malfunction, which changes the urging torque (the set torque) of the return spring 8, can be limited.

Second Embodiment

Figure 7:
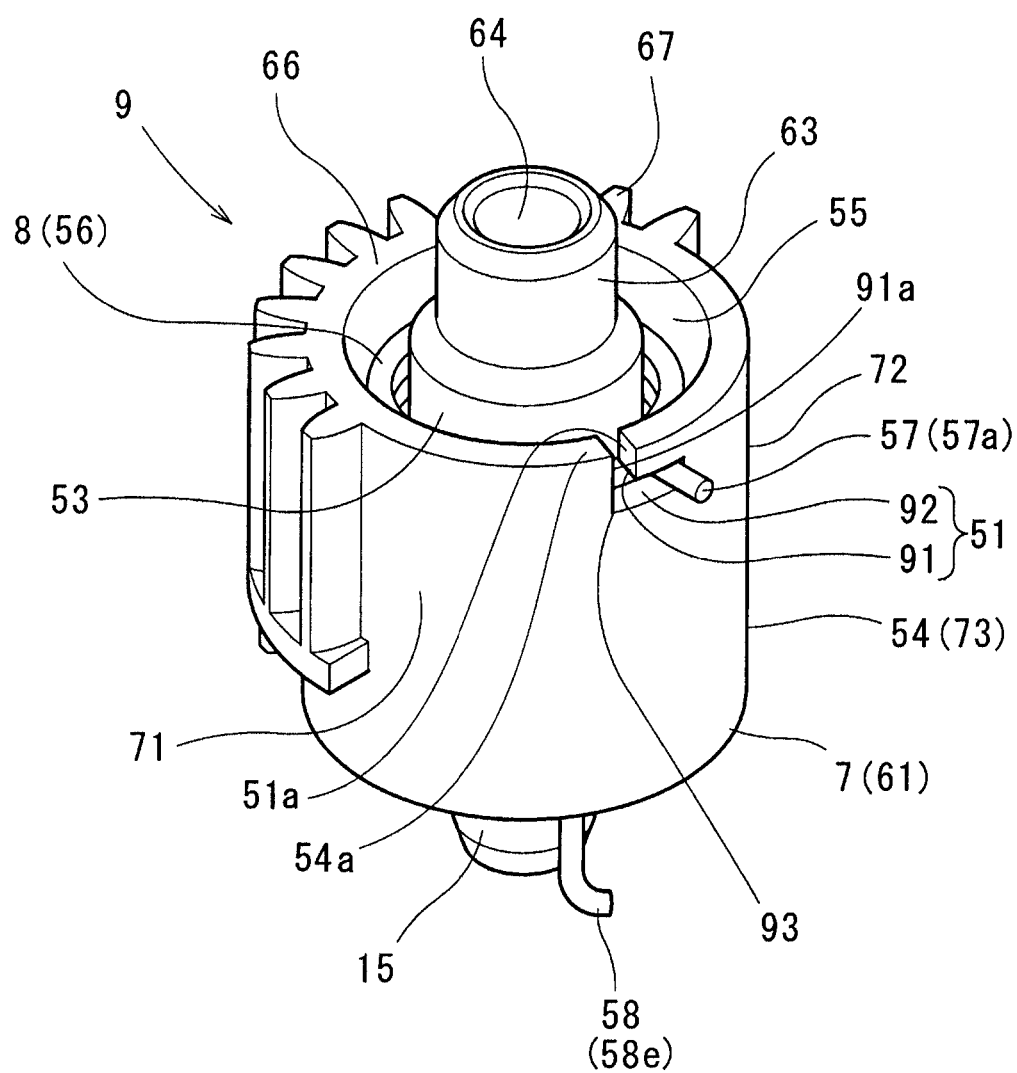
FIG. 7 is a perspective view showing an output gear subassembly according to a second embodiment of the present disclosure.
Figure 8A:
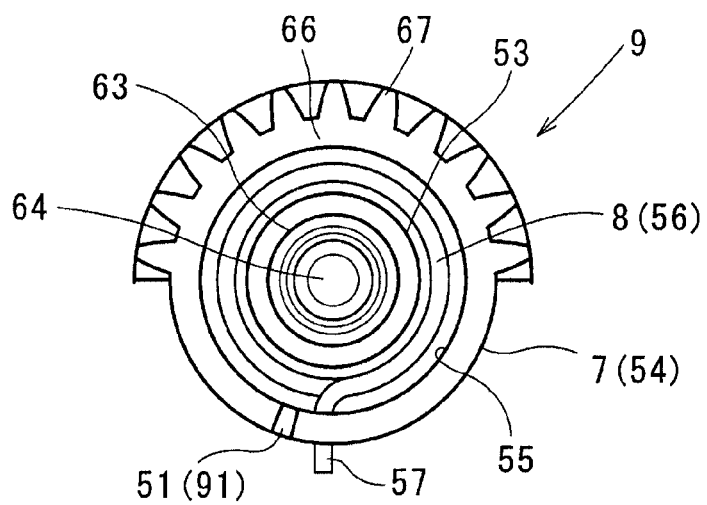
FIG. 8A is a plan view showing the output gear subassembly of the second embodiment.
Figure 8B:
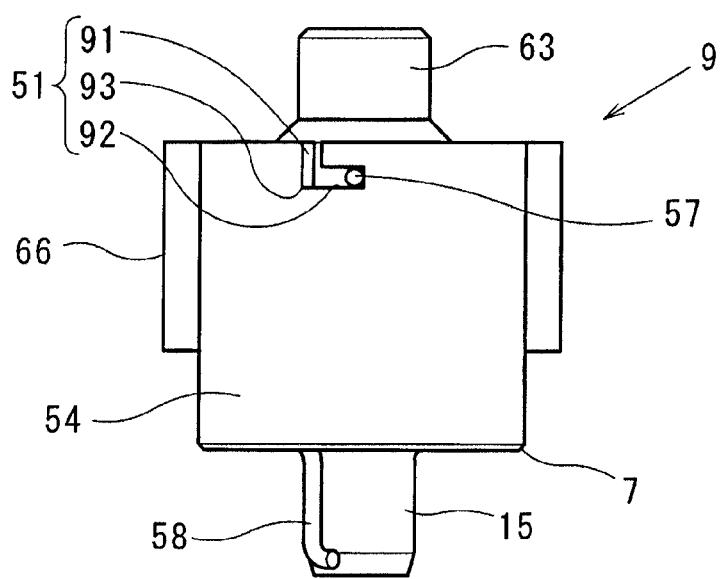
FIG. 8B is a side view showing the output gear subassembly of the second embodiment.
Figure 8C:
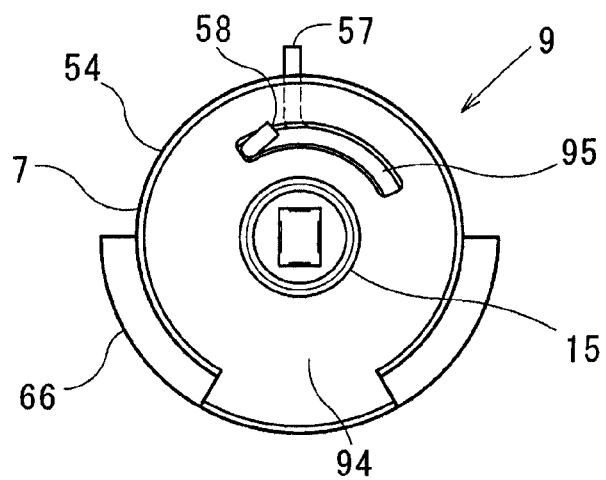
FIG. 8C is a bottom view showing the output gear subassembly of the second embodiment.

FIGS. 7 to 8C show an electric actuator according to a second embodiment of the present disclosure.

In the following discussion, the components, which are similar to those of the first embodiment, will be indicated by the same reference numerals and will not be described further for the sake of simplicity.

The open portion 74 of the first embodiment is eliminated from the radially outer guide 54 of the output gear 7 according to the present embodiment.

Furthermore, the second end portion 58 of the return spring 8 projects linearly from the other axial end of the coil 56 toward the outer side in the axial direction of the rotational axis and includes the second linear part 58e, which has the length that enables engagement of the second linear part 58e with the second slit 52.

Furthermore, the first slit 51, to which the first end portion 57 of the return spring 8 is engaged, has the opening 51a that opens in the axial end surface 54a of the radially outer guide 54. The first slit 51 includes slit holes 91, 92, which are arranged one after another to extend from the opening 51a of the first slit 51 such that the slit holes 91, 92 are bent relative to each other to form an L-shape in a middle of the first slit 51 and extend toward a deep side in the rotational direction (the circumferential direction). The slit holes 91, 92 may cooperate with each other to serve as a first slit hole of the present disclosure. A bent portion 93 is formed between the slit holes 91, 92.

The slit hole 91 is an axial slit hole, into which the first end portion 57 of the return spring 8 is insertable from the opening 51a of the first slit 51 toward the bent portion 93. A hole wall surface 91a of the slit hole 91 forms a removal limiting portion, which limits removal of the first end portion 57 of the return spring 8.

The slit hole 92 is a circumferential slit hole, into which the first end portion 57 of the return spring 8 is insertable from the bent portion 93 toward the deep side of the first slit 51 in the rotational direction (the circumferential direction).

An inside-to-outside communicating hole (a slit hole) 95, which is configured into an arcuate form, is formed in a bottom portion 94 of the output gear 7 to extend through the bottom portion 94 in the axial direction. The inside-to-outside communicating hole (serving as an inside-to-outside communicating portion) 95 opens for a predetermined rotational angle (an output gear operational angle) and communicates between the inside of the coil receiving chamber 55 of the output gear 7 and the outside of the coil receiving chamber 55. In this instance, the second end portion 58 of the return spring 8 is installed such that the second end portion 58 extends from the inside (the coil receiving chamber 55) of the bottom portion 94 of the output gear 7 to the outside of the bottom portion 94 of the output gear 7 through the inside-to-outside communicating hole 95.

As discussed above, the electric actuator of the present embodiment provides the advantages, which are similar to those of the first embodiment.

Third Embodiment

Figure 9:
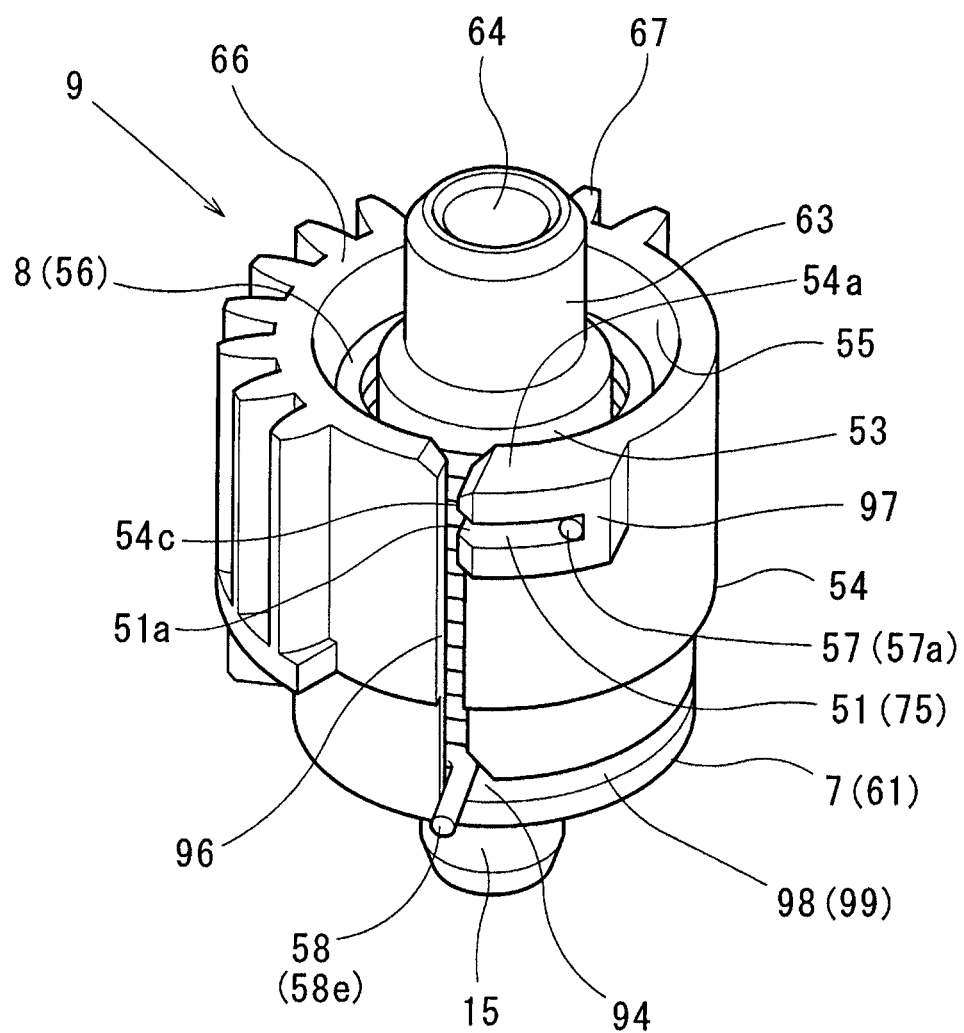
FIG. 9 is a perspective view showing an output gear subassembly according to a third embodiment of the present disclosure.
Figure 10A:
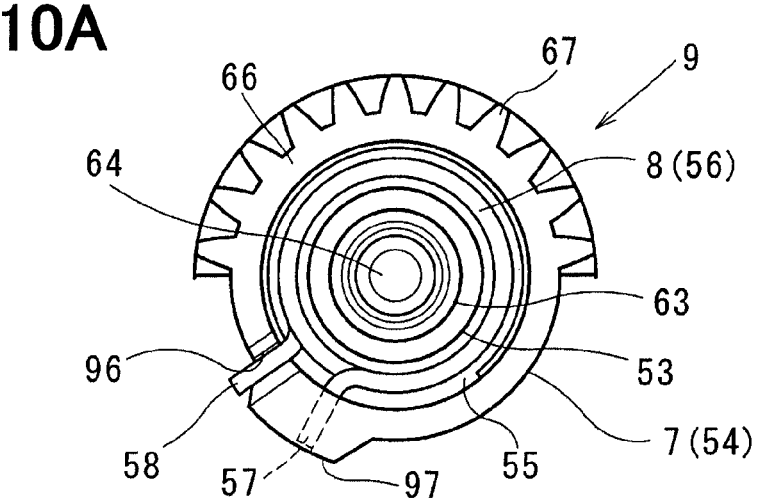
FIG. 10A is a plan view showing the output gear subassembly of the third embodiment.
Figure 10B:
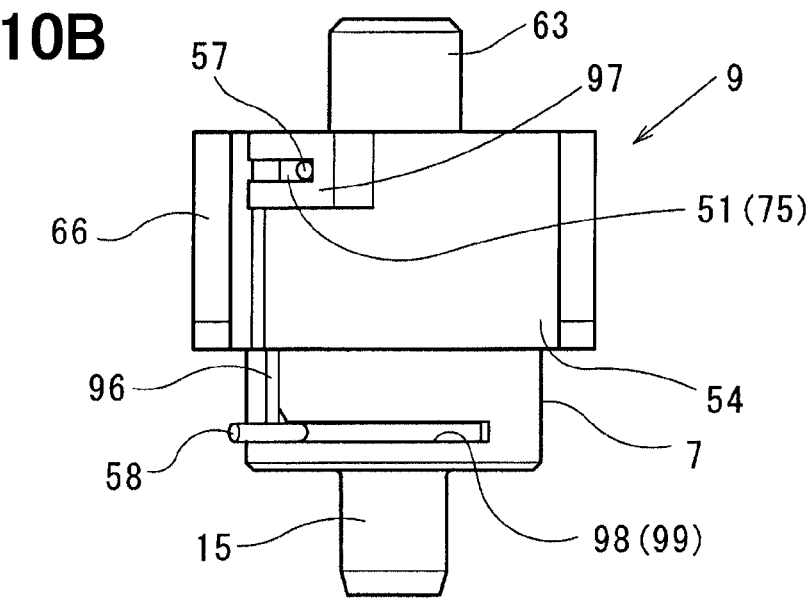
FIG. 10B is a side view showing the output gear subassembly of the third embodiment.
Figure 10C:
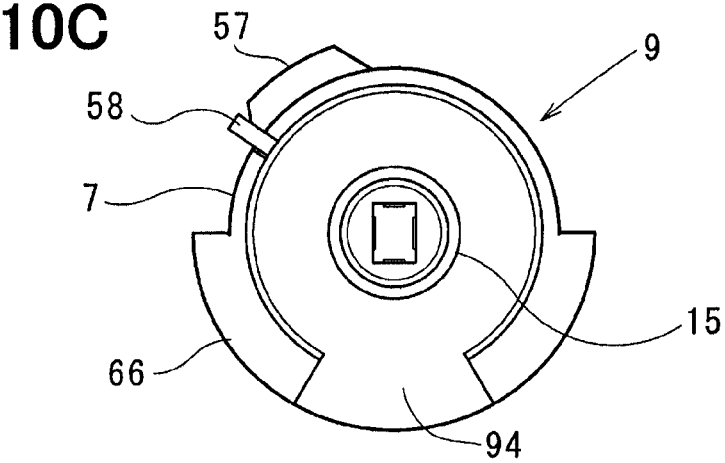
FIG. 10C is a bottom view showing the output gear subassembly of the third embodiment.
Figure 11A:
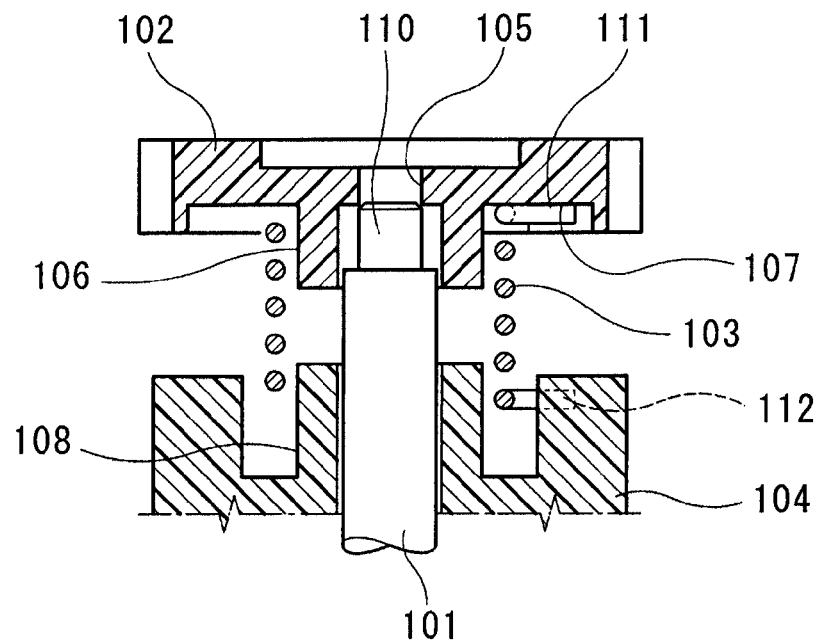
FIG. 11A is a cross sectional view showing one state in an assembling method of a gear subassembly relative to an installation member in a previously proposed technique.
Figure 11B:
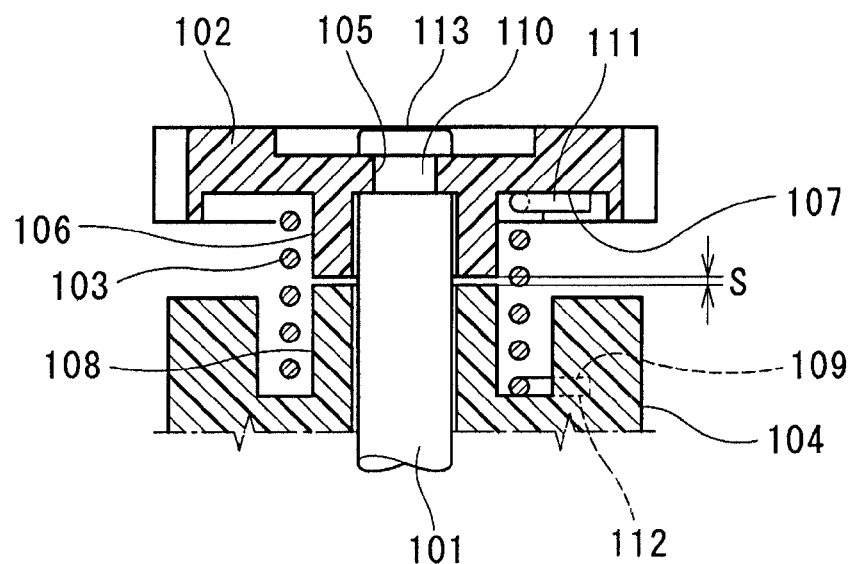
FIG. 11B is a cross sectional view showing another state in the assembling method of the gear subassembly relative to the installation member in the previously proposed technique.

FIGS. 9 to 10C show an electric actuator according to a third embodiment of the present disclosure.

In the following discussion, the components, which are similar to those of the first embodiment, will be indicated by the same reference numerals and will not be described further for the sake of simplicity.

The radially outer guide 54 of the output gear 7 of the present embodiment includes an axial slit hole 96 and a block (a thick wall portion) 97. The axial slit hole (serving as an inside-to-outside communicating portion) 96 extends from the axial end surface 54a of the radially outer guide 54 in the axial direction of the rotational axis of the output gear 7. The block 97 is configured into an arcuate form and is placed at a location, which is adjacent to the axial slit hole 96 and the axial end surface 54a of the radially outer guide 54.

Tapered guide surfaces are formed at the opening side of the axial slit hole 96 and the opening side of the block 97 to guide the first and second end portions 57, 58 of the return spring 8 into the axial slit hole 96 at the time of inserting the coil 56 of the return spring 8 from the one axial side (the upper side in FIG. 9) of the output gear 7 into the coil receiving chamber 55. The tapered guide surfaces are tilted surfaces, which are opposed to each other in the circumferential direction and progressively reduce the cross-sectional area of the opening of the axial slit hole 96 toward the deeper side of the axial slit hole 96. In other words, a circumferential distance between the tapered guide surfaces is progressively reduced toward the deeper side of the axial slit hole 96 in the axial direction.

The first slit 51 has the opening 51a that opens in a circumferential end surface 54c of the radially outer guide 54 in the rotational direction (the circumferential direction). The first slit 51 includes the circumferential slit hole (the first slit hole) 75 that extends linearly from the opening 51a of the first slit 51 toward a deep side in the rotational direction. The first end portion 57 of the return spring 8 is insertable into the circumferential slit hole 75 from the opening 51a of the first slit 51 toward the deep side in the rotational direction.

An inside-to-outside communicating hole (a slit hole) 98, which is configured into an arcuate form, is formed at the bottom portion 94 side of the radially outer guide 54 to radially extends through the corresponding portion of the radially outer guide 54. The inside-to-outside communicating hole (serving as an inside-to-outside communicating portion) 98 opens for a predetermined rotational angle (an output gear operational angle) and communicates between the inside of the coil receiving chamber 55 of the output gear 7 and the outside of the coil receiving chamber 55. The inside-to-outside communicating hole 98 opens to the axial slit hole 96 and includes a circumferential slit hole 99. The circumferential slit hole 99 arcuately extends from the opening of the inside-to-outside communicating hole 98 toward the deep side of the radially outer guide 54 in the rotational direction (the circumferential direction). The second end portion 58 of the return spring 8 is insertable into the circumferential slit hole 99 from the opening of the inside-to-outside communicating hole 98 toward the deep side in the rotational direction (the circumferential direction).

As discussed above, the electric actuator of the present embodiment provides the advantages, which are similar to those of the first and second embodiments.

Now, modifications of the above embodiments will be described.

In the above embodiments, the actuator of the present disclosure is applied as the electric actuator that includes the gear train, which transmits the drive torque of the motor M to the valve shaft 3 of the tumble control valve device. Alternatively, the actuator of the present disclosure may be applied as an electric actuator that includes a gear train, which conducts the rotational drive force of the motor M to a shaft of a valve (a drive subject) that opens and closes a flow passage.

Furthermore, the valve, which is the valve element of the intake air control valve device (e.g., the tumble control valve device or the intake air throttle valve device), or the valve, which is the valve element of the exhaust gas control valve device (e.g., the EGR control valve device or the exhaust gas throttle valve device), is not limited to be one of the multiple valves, which are connected one after another by, for example, the shaft. That is, the valve, which is the valve element of the intake air control valve device (e.g., the tumble control valve device or the intake air throttle valve device), or the valve, which is the valve element of the exhaust gas control valve device (e.g., the EGR control valve device or the exhaust gas throttle valve device), may be a single valve as long as the valve is placed in the flow passage communicated with the cylinder(s) of the internal combustion engine.

Furthermore, the valve (the drive subject), which opens and closes the flow passage, may be a rotary valve, a butterfly valve, a shutter valve, or a ball valve.

Here, the tumble control valve device includes the valves and the shaft. In the tumble control valve device, each valve generates the biased linear intake air flow (biased flow), which is biased to the one side in a direction of the height (i.e., a top-to-bottom direction in the case where a sliding direction of a piston in the cylinder is defined as the top-to-bottom direction) of the intake port of the internal combustion engine, so that the intake air circulating flow (a vortex flow, a tumble flow) is generated in the combustion chamber around the axis perpendicular to the axis of the cylinder in the engine. The shaft of the tumble control valve device supports the valves of the tumble control valve device.

Furthermore, the electric actuator of the present disclosure may be applied to a swirl control valve device. The swirl control valve device includes a valve and a shaft. In the swirl control valve device, the valve generates a biased linear intake air flow (biased flow), which is biased to the one side in a direction of the height (i.e., a top-to-bottom direction in the case where the sliding direction of the piston is defined as the top-to-bottom direction) of the intake port of the internal combustion engine, so that the intake air circulating flow (a vortex flow, a swirl flow) is generated in the combustion chamber around the axis of the cylinder in the engine. The shaft of the swirl control valve device supports the valve of the swirl control valve device.

In the above embodiments, the actuator of the present disclosure is applied to the electric actuator that rotates the valve shaft 3 of the tumble control valve device. Alternatively, the actuator of the present disclosure may be applied as an electric actuator that rotates a shaft of a variable intake air control valve used in a variable intake system, which improves an engine output torque by changing a flow passage length from a valve hole to an intake port of each cylinder of the internal combustion engine or a flow passage cross sectional area according to an operational state of the internal combustion engine to use an intake air pressure pulsation effect and an inertia charging effect that take place in the intake passage of the internal combustion engine.

Furthermore, the actuator of the present disclosure may be applied as an electric actuator that rotates a shaft of an intake air flow quantity control valve used in an electronic throttle (intake system), which adjusts the flow quantity of the intake air supplied to a combustion chamber of the internal combustion engine.

Furthermore, the shaft, which serves as the drive subject, may be a shaft of a valve of an intake air control valve, such as an intake air pressure control valve, a flow passage change valve, or an intake air throttle valve.

Furthermore, the shaft, which serves as the drive subject, may be a shaft of a valve of an exhaust gas control valve, such as a wastegate valve, a scroll change valve, an exhaust gas flow quantity control valve, an exhaust gas pressure control valve, a flow passage change valve, or an exhaust gas throttle valve.

The shaft, which serves as the drive subject, may be a shaft of a rotatable body (a rotator), such as a compressor, a blower, a pump, a cam, a rotor, or a vehicle wheel besides the shaft of the valve discussed above. Furthermore, in place of the shaft, which serves as the drive subject, a shaft or a rod of a linearly movable body, such as a piston or a valve, may be used.

Furthermore, the gear, to which the one end portion of the spring is installed, is not limited to the output gear 7 that is integrally rotatably connected to the shaft (the drive subject). For example, the gear, to which the one end portion of the spring is installed, may be another type of gear, such as the intermediate gear or the motor side gear. That is, it is not necessary to directly connect the shaft (the drive subject) to the gear, to which the one end portion of the spring is installed.

Furthermore, in the above embodiments, the turn-back portion 59 is formed in the output gear 7 as the stopper, which limits removable of the urging torque of the return spring 8. Alternatively, a stopper, which limits removal of the urging torque of the spring, may be provided to the installation member.

Here, it should be noted that the initial set angle (θ) is determined based on the operational angle of the tumble valve(s) and/or the output gear 7. Furthermore, the predetermined angle (α) is determined based on the set torque of the return spring 8, or the operational angle of the tumble valve(s) and/or the output gear 7. Furthermore, the diameter of the wire of the return spring 8 is determined based on the set torque of the return spring. Furthermore, a coil spring of a barrel shape or a nonlinear coil may be used as the coil of the present disclosure. Also, the coil may be a coil of an ellipse shape.

What is claimed is:

1. An actuator comprising:
   an electric motor;
   a gear that transmits a drive torque of the electric motor to a shaft of a drive subject to rotate the shaft of the drive subject;
   a spring that has one end portion, which is installed to the gear, wherein the spring generates an urging torque for urging the shaft in a rotational direction to rotate a rotational position of the shaft to a predetermined position; and
   an installation member, to which another end portion of the spring is installed, wherein:
   the gear includes:
     a radially inner guide that is formed around a rotational axis of the gear;
     a radially outer guide that is configured into a tubular form and is placed on a radially outer side of the radially inner guide while a receiving hole, which is configured into an annular form, is interposed between the radially inner guide and the radially outer guide; and
     a first slit that is located adjacent to an opening of the receiving hole and is formed by recessing a portion of the radially outer guide, wherein the one end portion of the spring is engaged to or is held by the first slit;
   the spring includes a coil that is spirally wound and is located between the one end portion and the another end portion of the spring, and the coil is resiliently deformably received in an inside of the receiving hole;

the installation member includes:
a covering wall that is placed adjacent to an opposite side of the receiving hole, which is opposite from the opening of the receiving hole, wherein the covering wall is located on a radially outer side of the radially outer guide in such a manner that the covering wall partially overlaps with the radially outer guide while a predetermined radial gap is interposed between the radially outer guide and the covering wall; and
a second slit that is formed by recessing a portion of the covering wall, wherein the another end portion of the spring is engaged to or held by the second slit;
the second slit has an opening, which opens at an axial end surface of the covering wall in an axial direction of the rotational axis, and the second slit includes:
a second slit hole that extends linearly from the opening of the second slit to a deep side in the axial direction of the rotational axis or extends from the opening of the second slit to the deep side in the axial direction of the rotational axis while the second slit is bent in a middle of the second slit, wherein the another end portion of the spring is insertable into the second slit hole from the opening of the second slit toward the deep side; and
a tilted slit portion, which is formed at an opening side of the second slit hole, wherein the another end portion of the spring is moved along the tilted slit portion to twist the coil to a predetermined set angle at a time of installing the another end portion of the spring to the second slit.

2. The actuator according to claim 1, wherein the tilted slit portion includes a tilted surface that is tilted by a predetermined angle relative to one of:
an installation direction of the gear with respect to the installation member; and
the axial direction of the rotational axis of the gear.

3. The actuator according to claim 1, wherein:
the receiving hole is a coil receiving chamber that is formed between the radially inner guide and the radially outer guide and has the opening, which opens at an axial end surface of the radially outer guide in the axial direction of the rotational axis, and the coil receiving chamber extends from the opening of the coil receiving chamber in the axial direction of the rotational axis to a deep side and is configured into the annular form to receive the coil of the spring.

4. The actuator according to claim 1, wherein the one end portion of the spring includes a first linear part, which projects linearly from one axial end of the coil of the spring in a radially outward direction or a tangential direction and has a length that enables engagement of the first linear part with the first slit.

5. The actuator according to claim 1, wherein the another end portion of the spring includes a second linear part, which projects linearly from another axial end of the coil in one of a radially outward direction, a tangential direction and the axial direction of the rotational axis and has a length that enables engagement of the second linear part with the second slit.

6. The actuator according to claim 1, wherein the gear includes an inside-to-outside communicating portion that communicates between the inside of the receiving hole and an outside of the receiving hole.

7. The actuator according to claim 6, wherein when the coil of the spring is installed in the receiving hole, the another end portion of the spring projects from the inside of the receiving hole to the outside of the receiving hole through the inside-to-outside communicating portion.

8. The actuator according to claim 1, wherein:
the first slit has an opening that opens in a circumferential end surface of the radially outer guide in the rotational direction;
the first slit includes a first slit hole that extends linearly from the opening of the first slit toward a deep side in the rotational direction; and
the one end portion of the spring is insertable into the first slit hole from the opening of the first slit toward the deep side in the rotational direction.

9. The actuator according to claim 1, wherein:
the first slit has an opening that opens in an axial end surface of the radially outer guide in the axial direction of the rotational axis;
the first slit includes a first slit hole that extends from the opening of the first slit such that the first slit hole is bent in a middle of the first slit hole and extends toward a deep side in the rotational direction; and
the one end portion of the spring is insertable into the first slit hole from the opening of the first slit toward the deep side.

10. An assembling method of the actuator of claim 1, comprising:
a first step of forming a gear assembly by assembling the spring to the gear; and
a second step of assembling the another end portion of the spring and the gear assembly to the installation member.

11. The assembling method according to claim 10, wherein the first step includes:
inserting the coil of the spring into the receiving hole and engaging the one end portion of the spring to the first slit by twisting the one end portion of the spring; and
protruding the another end portion of the spring to an outside of the gear.

12. The assembling method according to claim 10, wherein the second step includes:
positioning the gear relative to the installation member such that the another end portion of the spring is placed immediately above the tilted slit portion or immediately before the tilted slit portion; and, thereafter,
approaching the gear assembly toward a side of the installation member, at which the covering wall is placed, such that the another end portion of the spring is moved toward one side in the rotational direction of the gear along a surface of the tilted slit portion and is fed from an opening side of the second slit hole toward a deep side of the second slit hole.

* * * * *